US007253723B2

(12) United States Patent
Lindahl et al.

(10) Patent No.: US 7,253,723 B2
(45) Date of Patent: Aug. 7, 2007

(54) MIRROR ASSEMBLY

(75) Inventors: John O. Lindahl, Fruitport, MI (US); Peter J. Whitehead, Grand Rapids, MI (US); Niall R. Lynam, Holland, MI (US); John T. Uken, Jenison, MI (US); Lee Karner, Holland, MI (US); Richard R. Hook, Hudsonville, MI (US)

(73) Assignee: Donnelly Corporation, Holland, MI (US)

( * ) Notice: Subject to any disclaimer, the term of this patent is extended or adjusted under 35 U.S.C. 154(b) by 135 days.

(21) Appl. No.: 11/029,695

(22) Filed: Jan. 5, 2005

(65) Prior Publication Data

US 2005/0169003 A1 Aug. 4, 2005

Related U.S. Application Data

(63) Continuation-in-part of application No. PCT/US2004/015424, filed on May 18, 2004.

(60) Provisional application No. 60/556,259, filed on Mar. 25, 2004, provisional application No. 60/553,517, filed on Mar. 16, 2004, provisional application No. 60/535,559, filed on Jan. 9, 2004, provisional application No. 60/525,537, filed on Nov. 26, 2003, provisional application No. 60/471,546, filed on May 19, 2003.

(51) Int. Cl.
*B60Q 1/00* (2006.01)
*G02B 5/08* (2006.01)

(52) U.S. Cl. .................. 340/438; 340/425.5; 362/494; 359/838

(58) Field of Classification Search ................ 340/438
See application file for complete search history.

(56) References Cited

U.S. PATENT DOCUMENTS

| 4,436,371 A | 3/1984 | Wood et al. |
| 4,807,096 A | 2/1989 | Skogler et al. |
| 4,826,289 A | 5/1989 | Vandenbrink et al. |
| 4,862,594 A | 9/1989 | Schierbeek et al. |
| 4,936,533 A | 6/1990 | Adams et al. |

(Continued)

FOREIGN PATENT DOCUMENTS

WO  WO 2004/103772 A3  12/2004

OTHER PUBLICATIONS

U.S. Appl. No. 10/964,512, filed Oct. 13, 2004 by Applicants Kenneth Schofield et al., entitled Vehicle Communication System.

(Continued)

*Primary Examiner*—Donnie L. Crosland
(74) *Attorney, Agent, or Firm*—Van Dyke, Gardner, Linn & Burkhart, LLP

(57) ABSTRACT

An interior rearview mirror assembly for a vehicle includes a casing having a human machine interface thereat. The human machine interface includes at least one user actuatable input integrally formed at a portion of the casing during the molding operation that forms the casing. The mirror assembly includes circuitry. The user actuatable input may be actuatable by a user to operate at least one element of the circuitry. The human machine interface may be at least partially at a bezel portion of the casing, or may be at least partially at a rear casing portion of the mirror casing.

52 Claims, 9 Drawing Sheets

U.S. PATENT DOCUMENTS

| | | | |
|---|---|---|---|
| 4,937,945 A | 7/1990 | Schofield et al. |
| 5,100,095 A | 3/1992 | Haan et al. |
| 5,131,154 A | 7/1992 | Schierbeek et al. |
| 5,255,442 A | 10/1993 | Schierbeek et al. |
| 5,550,677 A | 8/1996 | Schofield et al. |
| 5,576,687 A | 11/1996 | Blank et al. |
| 5,594,222 A | 1/1997 | Caldwell |
| 5,632,092 A | 5/1997 | Blank et al. |
| 5,649,756 A | 7/1997 | Adams et al. |
| 5,668,663 A | 9/1997 | Varaprasad et al. |
| 5,673,994 A | 10/1997 | Fant, Jr. et al. |
| 5,708,410 A | 1/1998 | Blank et al. |
| 5,724,187 A | 3/1998 | Varaprasad et al. |
| 5,786,772 A | 7/1998 | Schofield et al. |
| 5,796,094 A | 8/1998 | Schofield et al. |
| 5,798,688 A | 8/1998 | Schofield |
| 5,820,097 A | 10/1998 | Spooner |
| 5,820,245 A | 10/1998 | Desmond et al. |
| 5,877,897 A | 3/1999 | Schofield et al. |
| 5,878,353 A | 3/1999 | Ul Azam et al. |
| 5,924,212 A | 7/1999 | Domanski |
| 5,929,786 A | 7/1999 | Schofield et al. |
| 5,940,503 A | 8/1999 | Palett et al. |
| 5,971,552 A | 10/1999 | O'Farrell et al. |
| 6,000,823 A | 12/1999 | Desmond et al. |
| 6,001,486 A | 12/1999 | Varaprasad et al. |
| 6,097,023 A | 8/2000 | Schofield et al. |
| 6,243,003 B1 | 6/2001 | DeLine et al. |
| 6,250,148 B1 | 6/2001 | Lynam |
| 6,278,377 B1 | 8/2001 | DeLine et al. |
| 6,310,611 B1 | 10/2001 | Caldwell |
| 6,313,454 B1 | 11/2001 | Bos et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,326,613 B1 | 12/2001 | Heslin et al. |
| 6,329,925 B1 | 12/2001 | Skiver et al. |
| 6,341,523 B2 | 1/2002 | Lynam |
| 6,353,392 B1 | 3/2002 | Schofield et al. |
| 6,369,804 B1 | 4/2002 | Sandbach |
| 6,420,975 B1 | 7/2002 | DeLine et al. |
| 6,428,172 B1 | 8/2002 | Hutzel et al. |
| 6,437,258 B1 | 8/2002 | Sandbach |
| 6,439,755 B1 | 8/2002 | Fant, Jr. et al. |
| 6,452,479 B1 | 9/2002 | Sandbach |
| 6,471,362 B1 | 10/2002 | Carter et al. |
| 6,477,464 B2 | 11/2002 | McCarthy et al. |
| 6,492,980 B2 | 12/2002 | Sandbach |
| 6,501,387 B2 | 12/2002 | Skiver et al. |
| 6,501,465 B2 | 12/2002 | Sandbach |
| 6,504,531 B1 | 1/2003 | Sandbach |
| 6,593,565 B2 | 7/2003 | Heslin et al. |
| 6,614,241 B2 | 9/2003 | Schmitt et al. |
| 6,627,918 B2 | 9/2003 | Getz et al. |
| 6,648,477 B2 | 11/2003 | Hutzel et al. |
| 6,678,614 B2 | 1/2004 | McCarthy et al. |
| 6,690,268 B2 | 2/2004 | Schofield et al. |
| 6,714,331 B2 | 3/2004 | Lewis et al. |
| 6,756,912 B2 | 6/2004 | Skiver et al. |
| 6,762,867 B2 | 7/2004 | Lippert et al. |
| 6,795,221 B1 | 9/2004 | Urey |
| 6,824,281 B2 | 11/2004 | Schofield et al. |
| 6,847,487 B2 | 1/2005 | Burgner |
| 6,882,287 B2 | 4/2005 | Schofield |
| 2002/0044065 A1 | 4/2002 | Quist et al. |
| 2002/0159270 A1 | 10/2002 | Lynam et al. |
| 2003/0236622 A1 | 12/2003 | Schofield |
| 2004/0016870 A1 | 1/2004 | Pawlicki et al. |
| 2004/0032675 A1 | 2/2004 | Weller et al. |
| 2004/0128065 A1 | 7/2004 | Taylor et al. |
| 2005/0078389 A1 | 4/2005 | Kulas et al. |
| 2005/0099693 A1 | 5/2005 | Schofield et al. |
| 2005/0134983 A1 | 6/2005 | Lynam |

OTHER PUBLICATIONS

U.S. Appl. No. 11/021,065, filed Dec. 23, 2004 by Applicants Ian A. McCabe et al., entitled Electro-Optic Mirror Cell.

U.S. Appl. No. 11/140,396, filed May 27, 2005 by Applicants John T. Uken et al., entitled Mirror Assembly for Vehicles.

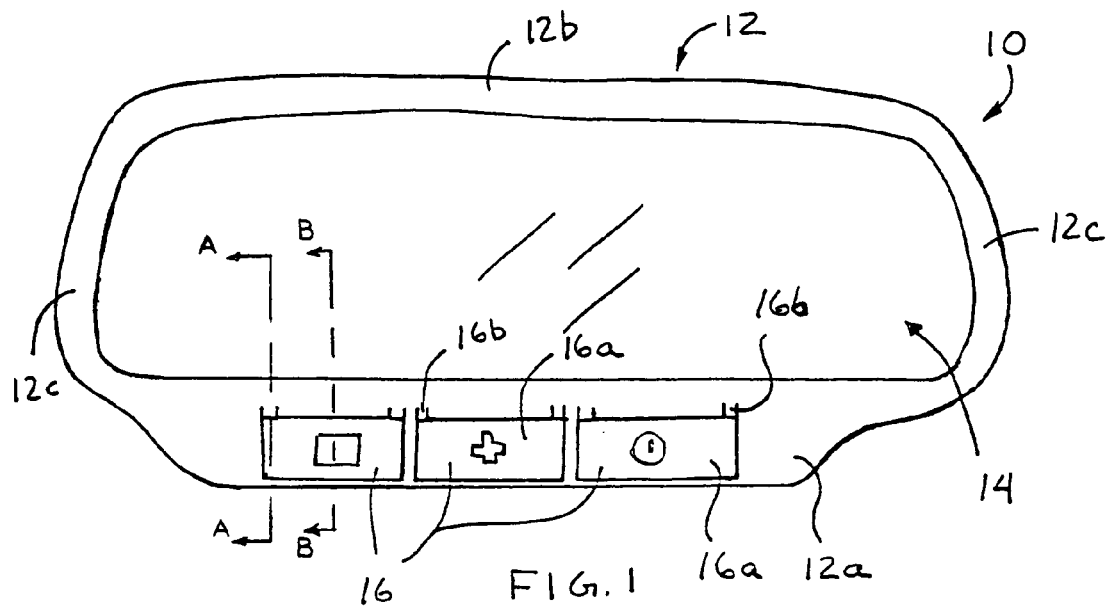
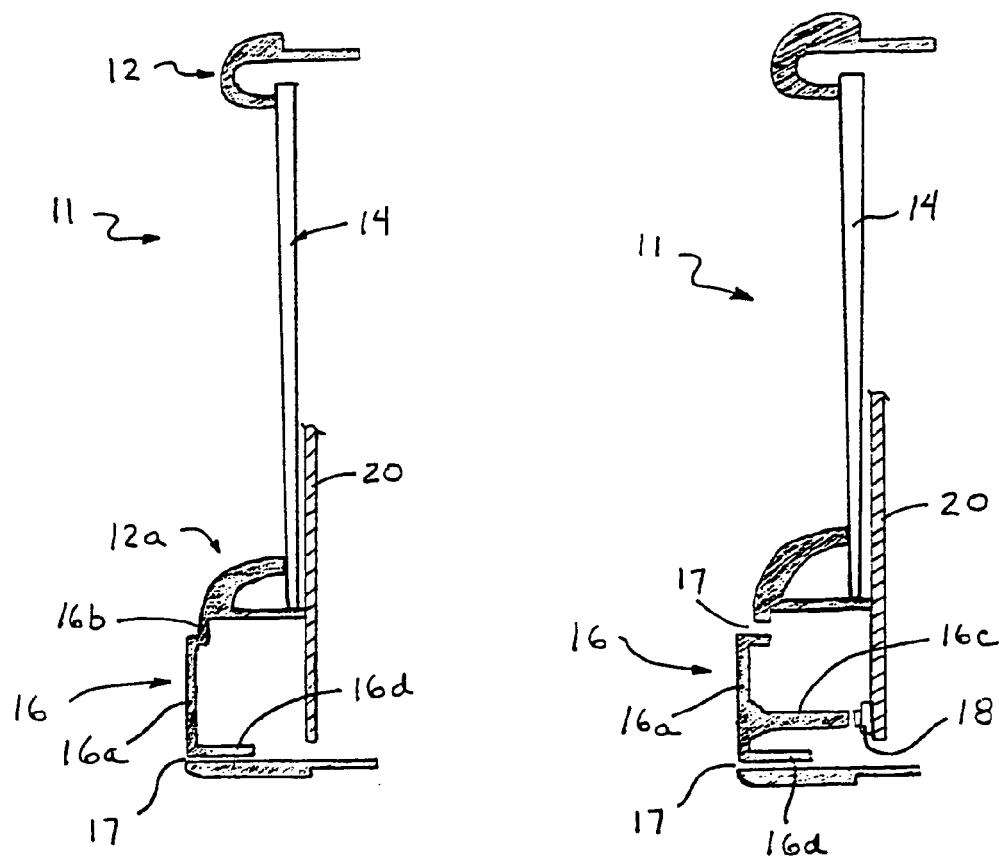
FIG. 1
FIG. 1A  FIG. 1B

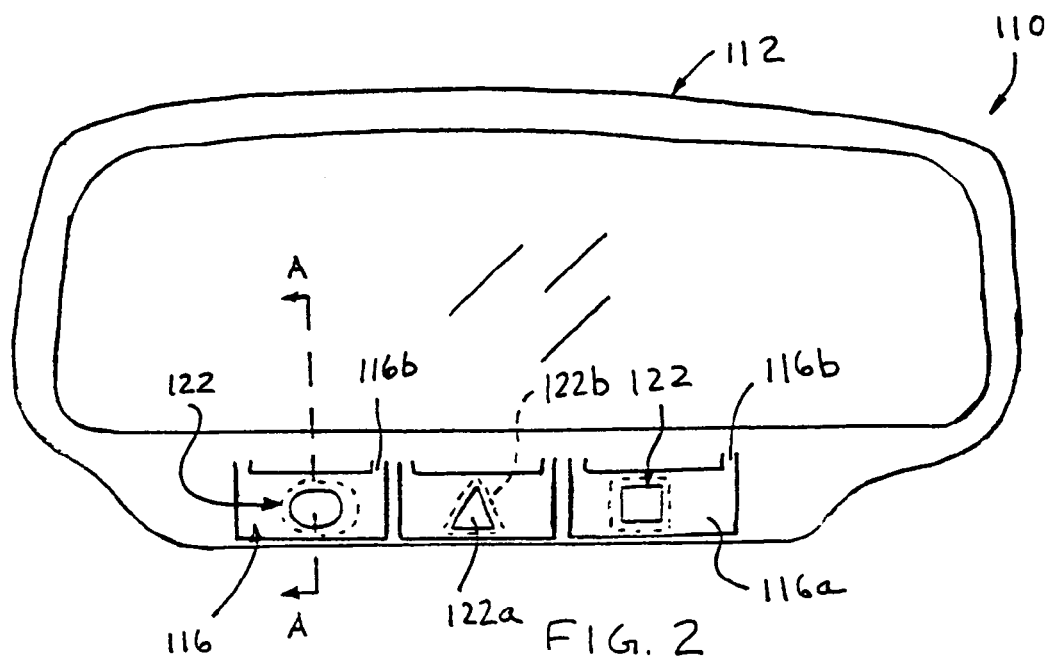
FIG. 2
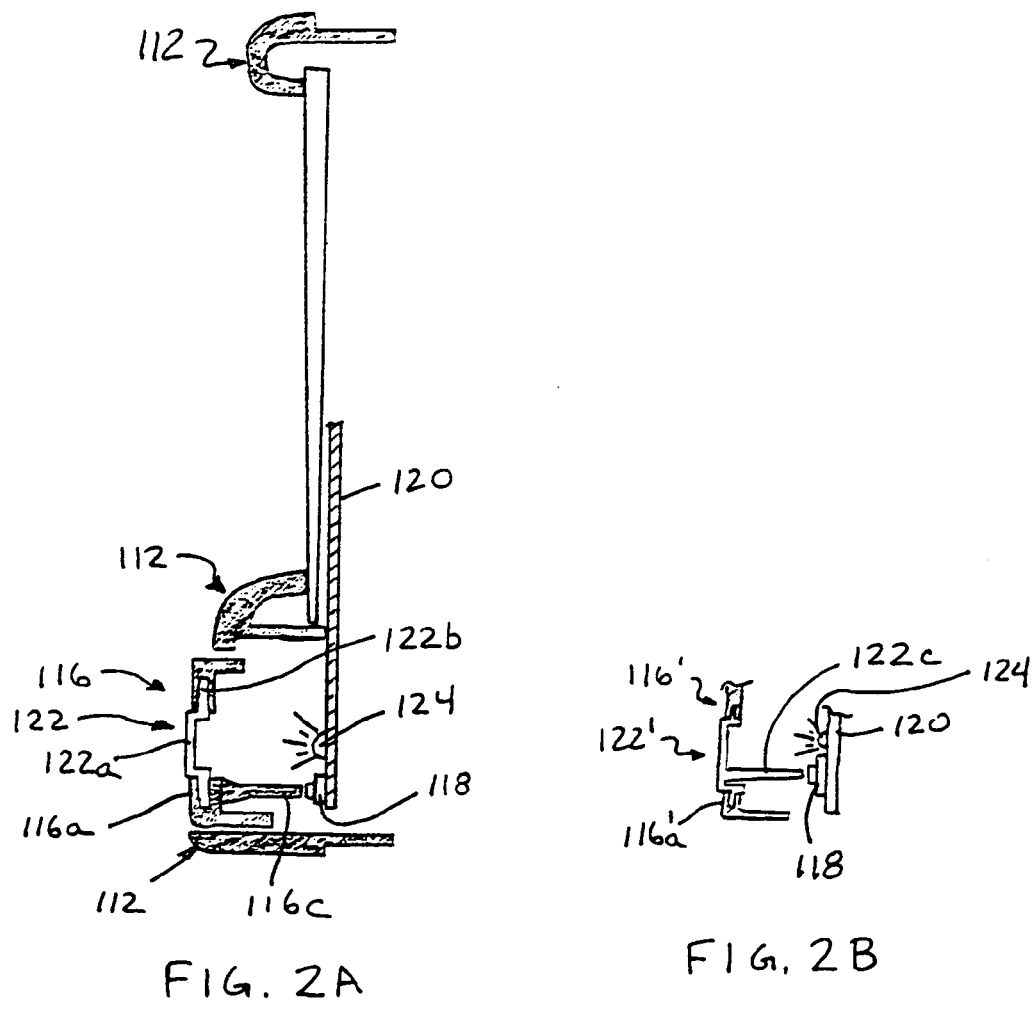
FIG. 2A
FIG. 2B

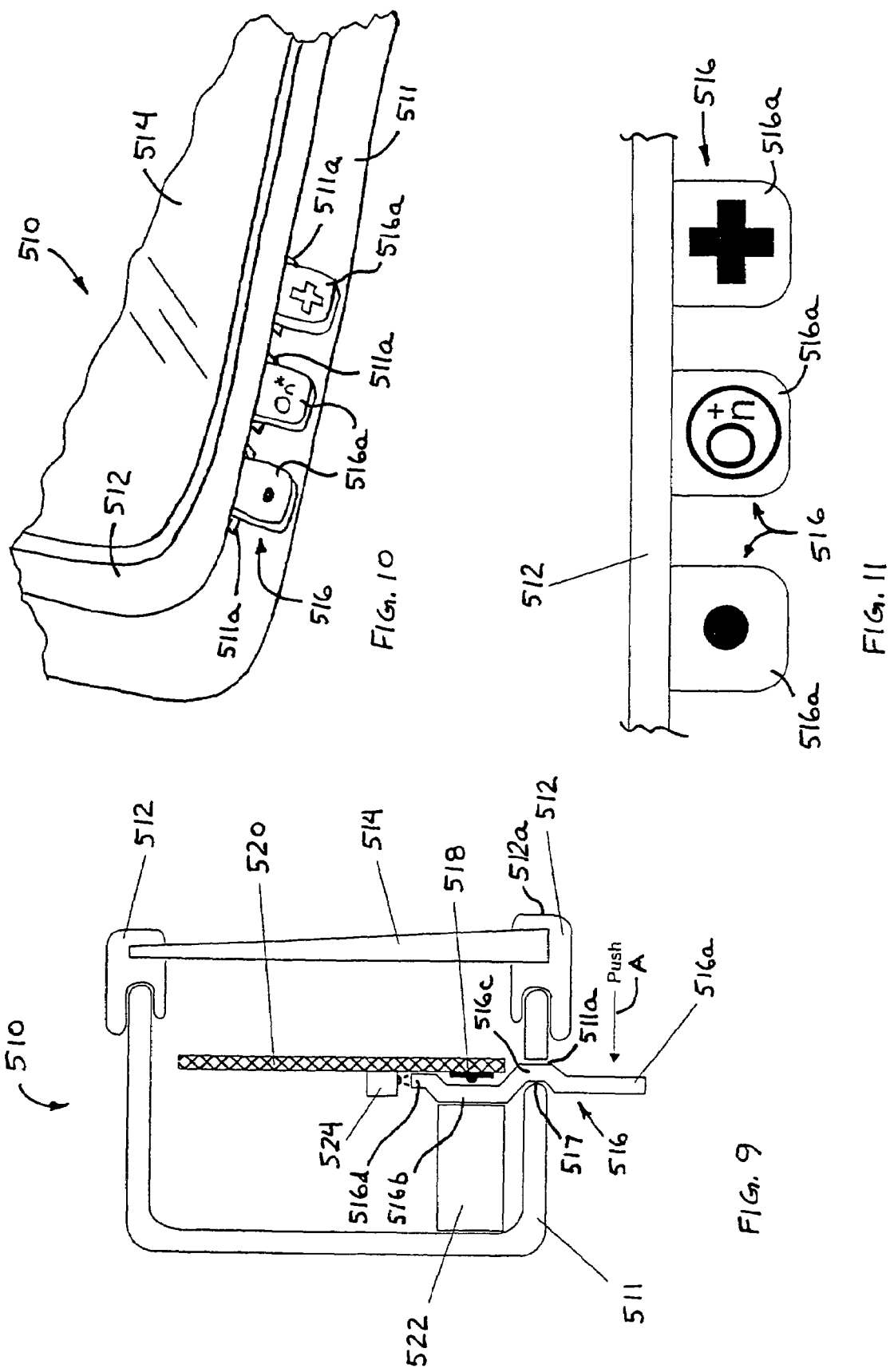

MIRROR ASSEMBLY

CROSS REFERENCE TO RELATED APPLICATIONS

The present application claims benefit of U.S. provisional applications, Ser. No. 60/535,559, filed Jan. 9, 2004; Ser. No. 60/553,517, filed Mar. 16, 2004; and Ser. No. 60/556,259, filed Mar. 25, 2004, and is a continuation-in-part of PCT Application No. PCT/US2004/015424, filed May 18, 2004 by Donnelly Corp. et al. for MIRROR ASSEMBLY FOR VEHICLE, which claims benefit of U.S. provisional applications, Ser. No. 60/471,546, filed May 19, 2003; Ser. No. 60/525,537, filed Nov. 26, 2003; and Ser. No. 60/556,259, filed Mar. 25, 2004, which are all hereby incorporated herein by reference in their entireties.

FIELD OF THE INVENTION

The present invention relates generally to rearview mirror assemblies for vehicles and, more particularly, to interior rearview mirror assemblies having user actuatable inputs or actuators or buttons for actuating or controlling one or more accessories of the vehicle or mirror assembly or accessory module or the like. Aspects of the present invention are equally suitable for application to a windshield electronics module or accessory module or the like.

BACKGROUND OF THE INVENTION

It is known to provide buttons or inputs along a bezel portion of an interior rearview mirror assembly for a vehicle. The buttons may be depressed by a user to actuate corresponding switches, such as switches mounted on a printed circuit board within the mirror assembly. Typically, the buttons are formed on a flexible keypad that is placed at the bezel portion such that the buttons extend through apertures or openings formed through the bezel portion of the mirror assembly, such as disclosed in U.S. Pat. No. 6,501,387, issued to Skiver et al., which is hereby incorporated herein by reference.

Typically, the mirror manufacturer may purchase or obtain the bezel portion of the mirror assembly from a supplier, or may make it in a bezel fabrication operation, such as a molding operation. The bezel portion may have openings or apertures therethrough, such as in a chin area of the bezel. The mirror manufacturer may also purchase or obtain a printed circuit board from another suppler, or may make such internally. The printed circuit board (PCB) typically includes small switches for actuating or controlling or adjusting an accessory of the mirror assembly or vehicle. The printed circuit board is often positioned to the rear of the reflective element and within the mirror casing. A flexible keypad or buttons may be positioned so as to protrude through the openings in the bezel when the bezel is attached to the casing to assemble the mirror assembly. The bezel may be assembled to the mirror casing, with the reflective element and printed circuit board positioned within the mirror assembly, and with the keypad or buttons positioned at the corresponding switches on the printed circuit board and aligned with and/or at least partially protruding through the corresponding openings in the bezel. The buttons may then be depressed to actuate the switches on the printed circuit board.

SUMMARY OF THE INVENTION

The present invention provides an interior rearview mirror assembly or windshield electronics/accessory module that includes at least one user actuatable control, such as a manual or user input or button or actuator or the like, integrally formed with the bezel of the mirror assembly when the bezel is being formed, such as in a molding operation. Alternately, the user input or actuator may be integrally formed with the casing or housing of the windshield electronics/accessory module when the casing or housing is being formed, such as in a molding operation. The user input or actuator or actuators thus are formed with or integrally formed with the bezel or casing in the same fabrication operation, such as a bezel molding operation, in order to ease the assembly process of the mirror assembly or windshield electronics/accessory module. When assembled into the interior rearview mirror assembly or windshield electronics/accessory module, user actuation of the actuator or actuators preferably in turn causes switch actuation of a switch device of an electrical circuit of the interior rearview mirror assembly or windshield electronics/accessory module. Preferably, such switches are PCB mountable microswitches that are mounted on a printed circuit board (PCB), typically along with other electronic components and circuitry, that may be supplied to the interior mirror assembler, such as by an electronics manufacturer.

According to an aspect of the present invention, an interior rearview mirror assembly for a vehicle includes a casing having a human machine interface thereat. The human machine interface comprises at least one user actuatable input integrally formed at a portion of the casing during the molding operation that forms the casing. The mirror assembly includes circuitry. The user actuatable input is actuatable by a user to operate at least one element of the circuitry.

According to another aspect of the present invention, an interior rearview mirror assembly for a vehicle includes a casing having a bezel portion and a printed circuit board positioned within the casing. The bezel portion includes at least one user input or actuator, such as a button or toggle input/actuator or the like, integrally formed therewith in a molding operation. When the mirror assembly is assembled, the user input preferably is positioned at and configured to actuate a corresponding switch or switches at the printed circuit board.

The user input may comprise a portion of the bezel and may flex to actuate the switch at the printed circuit board. Optionally, the user input may comprise an insert portion that is insert molded within a portion of the bezel while the bezel portion is being formed, such as by a molding operation. The insert portion may be flexible to actuate the switch at the printed circuit board. Optionally, the insert portion may be at least partially transparent or semi-transparent or translucent, and may be back lit by an illumination source or light source at the printed circuit board. The user input or insert portion may include icons or indicia or the like formed or printed thereon to indicate the function of the corresponding switch at the printed circuit board. Alternately or additionally, the user input or insert portion may be molded of a material or decorated with or made of a material that is a different color (or may be printed or colored with a different color) than that of the bezel itself. Optionally, the button or input may have a different textural surface if desired.

According to another aspect of the present invention, a method of manufacturing an interior rearview mirror assembly for a vehicle includes providing a mold cavity for forming a bezel of the mirror assembly and integrally molding at least a portion of a user input or actuator with the bezel portion during the molding process. In one form, the bezel portion is molded around pins or inserts or walls or the like that partially separate a molded user input portion or actuator portion from the bezel portion during the molding process. In another form, a user input portion is insert molded at least partially within the bezel portion during the molding process. The user input portion is thus integrally formed with the bezel portion during the molding process. The bezel (with the integrally molded user input portion) may be assembled to a mirror casing such that the user input portion may be positioned at one or more corresponding switches on a printed circuit board within the mirror casing. When the mirror is assembled, the user input portion may flex (such as in response to a user input, such as pressing the user input portion) relative to the bezel portion to actuate the switch at the printed circuit board.

Preferably, the bezel, with integrated inputs/actuators, is formed via a single shot molding process. However, the bezel, with integrated inputs/actuators, may be formed via a two shot molding process or other molding or forming process, without affecting the scope of the present invention.

Optionally, aspects of the present invention may be equally suited for application to a windshield electronics module or accessory module or the like. For example, one or more user inputs or actuators or buttons or toggles may be integrally formed or molded with a casing or housing or portion thereof of a windshield electronics module or accessory module or pod or the like during the molding of the casing or housing, without affecting the scope of the present invention.

According to another aspect of the present invention, an interior rearview mirror assembly for a vehicle includes a casing, a printed circuit board positioned within the casing, and at least one user input or actuator, such as a toggle or switch or lever or the like. The user input extends generally along a portion of the printed circuit board and extends through an opening in the casing and outward from said casing so that a user may access and actuate or toggle the user input between an actuated position or orientation and a non-actuated position or orientation. When the user input is depressed or actuated by a user, the user input moves to the actuated position and contacts a switch at the printed circuit board. A biasing member or cushioning member is positioned within the casing to engage the user input and generally maintain the user input in the non-actuated position when the user input is released.

The user input may comprise a plastic or polymeric member that may be formed to contact the printed circuit board at one end and to contact the mirror casing at a location remote from the one end, and may be spaced from the switch when in the non-actuated position. When the user input is pressed or moved by a user, the casing limits movement of the user input, and the printed circuit board limits pivoting of the user input at the one end, whereby the user input may flex to contact and engage and actuate the switch. When the user input is released, the biasing or cushioning member limits pivotal movement of the user input away from the printed circuit board.

Optionally, an illumination source, such as a light emitting diode (LED) or the like, may be positioned at the printed circuit board to illuminate at least a portion of the user input that is visible to an occupant of the vehicle. The user input may comprise a light pipe, such that illumination from an illumination source at one end of the user input or lever is transmitted along the user input to illuminate the opposite end of the user input that is viewable by an occupant of the vehicle. The exposed end portion of the user input thus may be illuminated via an illumination source positioned within the mirror casing to illuminate the text or graphics or icons or the like on the user input during low lighting conditions, such as at nighttime.

Therefore, the present invention provides a manual or user input or actuator or button or toggle that is integrally molded or formed with the bezel of an interior rearview mirror assembly or that is insert molded in the bezel during the molding of the bezel. The actuator is integrally formed with the bezel so that a separate keypad or other buttons need not be assembled or positioned at the bezel during the assembly of the mirror assembly. The bezel (with the integrally formed or molded or insert molded toggle or button or actuator or the like) may be attached to a reflective element and/or printed circuit board and/or mirror casing, such that the actuator is positioned at or aligned with a corresponding PCB-mounted switch at the printed circuit board within the mirror assembly. The present invention thus provides enhanced manufacturing and assembly of an interior rearview mirror assembly. The actuator may include an insert portion that is insert molded with the bezel and that may be flexible to facilitate actuation of the PCB switch at the printed circuit board. The input or actuator or insert may be backlit or otherwise illuminated and/or may have icons or indicia or the like printed or formed thereon. The inputs or actuators may be integrally molded or formed with a casing portion of an interior rearview mirror assembly or of a windshield electronics module or of an accessory module or the like during molding of the casing portion, without affecting the scope of the present invention. Optionally, the user input may be positioned partially within the casing and may pivot and/or flex to contact and actuate the switch or switches at the printed circuit board. The user input thus may comprise a low cost plastic or polymeric lever or member that may be readily positioned within the casing during assembly of the rearview mirror assembly.

These and other objects, advantages, purposes and features of the present invention will become apparent upon review of the following specification in conjunction with the drawings.

BRIEF DESCRIPTION OF THE DRAWINGS

FIG. 1 is a front elevation of an interior rearview mirror assembly in accordance with the present invention;

FIG. 1A is a sectional view of the interior rearview mirror assembly taken along the line A—A in FIG. 1;

FIG. 1B is a sectional view of the interior rearview mirror assembly taken along the line B—B in FIG. 1;

FIG. 2 is a front elevation of another interior rearview mirror assembly in accordance with the present invention;

FIG. 2A is a sectional view of the interior rearview mirror assembly taken along the line A—A in FIG. 2, showing an actuator or input of the present invention;

FIG. 2B is another sectional view similar to FIG. 2A of another actuator or input of the present invention;

FIG. 9 is a sectional view of another interior rearview mirror assembly taken generally along a centerline of a user input or actuator of the present invention;

FIG. 10 is a perspective view of a lower portion of the mirror assembly of FIG. 9, showing the user inputs or actuators at the lower portion;

FIG. 11 is a front elevation of the user inputs of FIGS. 9 and 10, viewing forwardly in a direction of travel of the vehicle;

DESCRIPTION OF THE PREFERRED EMBODIMENTS

Figure 3:
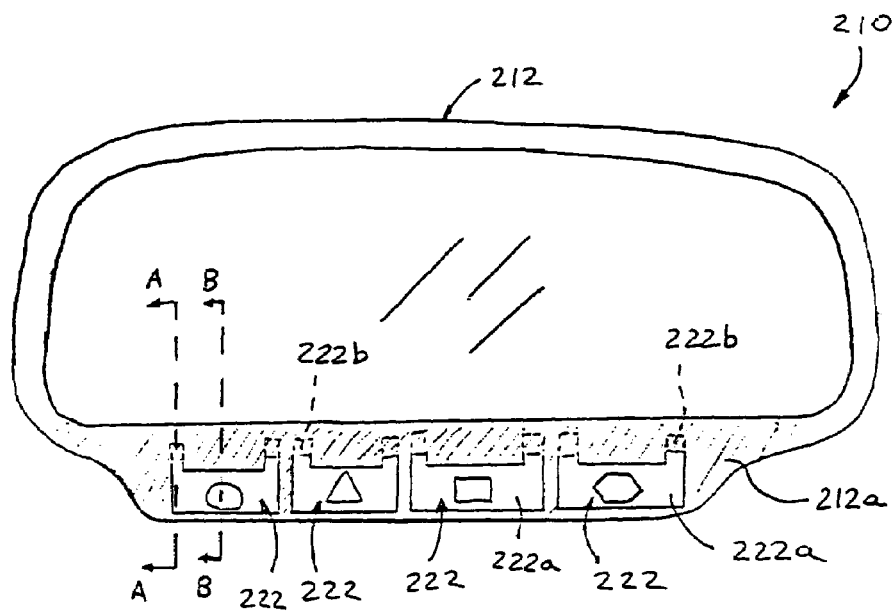
FIG. 3 is a front elevation of another interior rearview mirror assembly in accordance with the present invention.

Referring now to the drawings and the illustrative embodiments depicted therein, an interior rearview mirror assembly 10 includes a casing or housing, which may include a bezel portion 12, and a reflective element 14, and a human machine interface (HMI) that includes at least one user input or user actuatable input or actuator 16, such as a button or toggle or the like at the bezel 12 of the casing or elsewhere at the casing of the mirror assembly (FIGS. 1, 1A and 1B). User actuatable inputs 16 are integrally formed with bezel 12, such as at a chin portion 12a of bezel 12 (or elsewhere around the bezel, such as at an eyebrow portion 12b of the bezel or on the sides 12c of the bezel or the like), during the molding of the bezel. Mirror assembly 10 includes at least one electronic element or switch 18, which may be positioned within the mirror casing. For example, the element or switch 18 may comprise a PCB-mountable microswitch that may be mounted on or at a printed circuit board (PCB) 20 or the like positioned within the mirror casing. PCB elements or switch or switches 18 are positioned generally behind a respective user input 16, such that the user input or button 16 may be actuated or depressed to actuate the respective switch when the bezel 12 is attached to the mirror casing, as discussed below.

The PCB electronic elements or switches 18 are operable or actuatable to activate/deactivate or adjust or control or operate an electrical accessory or component or feature or the like (such as the accessories or systems discussed below) associated with the printed circuit board or with the rearview mirror assembly or with the vehicle. The accessory or component or feature may be incorporated onto the printed circuit board 20 or may be positioned elsewhere in or at the mirror assembly or elsewhere in or at the vehicle, such as in an accessory module or windshield electronics module or the like, such as an accessory module/windshield electronics module of the type described in U.S. Pat. Nos. 6,824,281; 6,690,268; 6,250,148; 6,341,523; 6,593,565; and 6,326,613; and/or U.S. patent application, Ser. No. 10/958,087, filed Oct. 4, 2004 by Schofield et al. for VEHICLE ACCESSORY MODULE, now U.S. Pat. No. 7,188,963, and/or U.S. provisional applications, Ser. No. 60/420,560, filed Oct. 23, 2002; Ser. No. 60/398,346, filed Jul. 24, 2002; Ser. No. 60/381,314, filed May 17, 2002; Ser. No. 60/374,724, filed Apr. 23, 2002; Ser. No. 60/364,008, filed Mar. 14, 2002; Ser. No. 60/350,965, filed Jan. 31, 2002; and/or Ser. No. 60/522,123, filed Aug. 18, 2004 by DeWard for ACCESSORY MODULE FOR VEHICLE, which are all hereby incorporated herein by reference. Optionally, the user input or buttons or interfaces may be integrally formed or molded at a casing or housing of an accessory module or windshield electronics module or the like and may be actuatable or depressible to actuate an electronic switch incorporated into the accessory module or windshield electronics module or the like, without affecting the scope of the present invention.

Optionally, the user inputs of the human machine interface may be actuatable to control or operate or activate/deactivate a telematics system of the vehicle, such as an ONSTAR® system of the vehicle or the like (such as found in General Motors vehicles and such as described in U.S. Pat. Nos. 4,862,594; 4,937,945; 5,131,154; 5,255,442; 5,632,092; 5,798,688; 5,971,552; 5,924,212; 6,243,003; 6,278,377; 6,420,975; 6,477,464; and/or 6,678,614; and/or U.S. patent applications, Ser. No. 10/456,599, filed Jun. 6, 2003 by Weller et al. for INTERIOR REARVIEW MIRROR SYSTEM WITH COMPASS, now U.S Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; Ser. No. 10/422,378, filed Apr. 24, 2003 by Schofield for IMAGING SYSTEM FOR VEHICLE, now U.S Pat. No. 6,946,978; Ser. No. 10/964,512, filed Oct. 13, 2004 by Schofield et al. for VEHICLE COMMUNICATION SYSTEM; and/or Ser. No. 10/993,302, filed Nov. 19, 2004 by Lynam for MIRROR REFLECTIVE ELEMENT FOR A VEHICLE; and/or PCT Application No. PCT/US03/40611, filed Dec. 19, 2003 by Donnelly Corporation et al. for ACCESSORY SYSTEM FOR VEHICLE, and published on Jul. 15, 2004 as PCT publication No. WO 2004/058540 A2, and/or PCT Application No. PCT/US03/030877, filed Oct. 1, 2003 by Donnelly Corp. for MICROPHONE SYSTEM FOR VEHICLE, and published on Apr. 15, 2004 as PCT Publication No. WO 2004/032568 A1, (which are all hereby incorporated herein by reference). In prior systems (such as described in U.S. Pat. No. 6,471,362, which is hereby incorporated herein by reference), non-integrally formed user interfaces have been used at a mirror assembly for a vehicle. The user inputs of the human machine interface of the present invention provides an enhanced system and is more readily implemented for use in interior rearview mirror assemblies and/or accessory modules and/or the like, than the user inputs or interfaces of the known systems or assemblies.

As shown in FIGS. 1, 1A and 1B, each user input 16 of the human machine interface may be formed as part of or integral with the chin portion 12a of bezel 12 during the molding of the bezel. For example, user input 16 may comprise a user actuated portion or a body portion or button portion or push pad portion 16a that may be movable (such as via a user's finger pressing against the button portion) relative to bezel 12 via flexing of one or more tabs or connecting elements 16b, in order to actuate the element or switch 18. The button portion 16a may include text or graphics or icons or other indicia printed or formed thereon to indicate to a user what the function of the button is or what accessory or feature the button controls. Optionally, the button portion 16a may have a different exterior surface texture to differentiate the button portion from the chin portion 12a of the bezel 12. As shown in FIG. 1, the flexible tabs or connecting elements 16b may be narrow elements or portions at opposite ends of (or elsewhere around or partially around) the button portion, such that the button portion may be pressed inward by a user and the flexible tabs or elements may flex to allow inward movement of the button portion to activate the element or switch 18. As shown in FIG. 1B, the button portion 16a may have a pin or arm or extension 16c that extends inward toward the element or switch 18, such that as button portion 16a is pressed inward, pin 16c engages and actuates the element or switch 18 at printed circuit board 20. Typically, the button is only depressed or moved a short distance, such as approximately ¼ mm to approximately 1 mm or thereabouts, to actuate the PCB switch with the pin or extension.

Button portion 16a may be integrally formed or molded with bezel 12 during molding of the bezel and, thus, may comprise the same material, such as polypropylene or the like, and may be formed by inserts or pins or walls or portions or the like positioned within the mold cavity to define a gap 17 between button portion 16a and chin portion 12a of bezel 12 after the bezel is molded and cooled and cured. The gap 17 may be defined substantially around button portion 16a except at the tabs or connecting elements 16b, such that the button portion 16a may move relative to bezel 12 as tabs 16b flex or bend. As shown in FIGS. 1A and 1B, button portion 16a may include inward extending portions or lips or edges 16d that extend inward along bezel 12 to provide structural rigidity to the button portion 16a and/or to provide an enhanced appearance to the button portion and the bezel by partially closing the gap or gaps 17 to limit visibility through the gaps. Optionally, the gap or gaps 17 may be small enough or minimal to limit visibility therethrough to enhance the appearance of the mirror assembly. Optionally, the button portion 16a may be formed to be thick enough to be substantially rigid or non-flexible.

User input or inputs 16 thus may be integrally formed with the bezel of the mirror assembly, such that an additional keypad or set of buttons or the like need not be aligned with and/or inserted into the appropriate openings in the bezel and held in place during the assembly process. Optionally, the integrally formed bezel and user inputs (and the reflective element and printed circuit board) may comprise a bezel assembly 11 (FIGS. 1A and 1B) that may be secured to or attached to the mirror casing to form the mirror assembly. Optionally, the bezel portion may comprise a unitary or one-piece bezel portion (preferably molded from a thermoplastic resin, such as polypropylene or the like), which receives the reflective element therein. Optionally, the reflective element (and optionally a toggle assembly for a prismatic mirror assembly) may be secured into place in the bezel while the molded bezel (preferably the freshly molded bezel portion) is still warm and pliable, such as disclosed in U.S. Pat. No. 4,436,371, issued to Wood et al., which is hereby incorporated herein by reference. When the molded bezel portion (preferably the freshly molded bezel portion and thus just exiting the injection molding press, or alternately, and less desirably, a heated bezel portion having been heated, such as in an oven or the like, to make the bezel portion warm and pliable) cools and shrinks, the bezel portion grips around the reflective element (and toggle assembly) to retain the reflective element (and toggle assembly) in the mirror assembly. The assembled bezel assembly then may be snapped into or otherwise attached to the casing to complete the mirror assembly. Optionally, however, the bezel and user inputs may be integrally formed during a molding process, and the bezel may be attached to the casing (which may include or house or contain the reflective element and printed circuit board) to assemble the mirror assembly. Optionally, the user inputs may be integrally formed elsewhere on the mirror assembly, such as on or in the casing of the mirror assembly. The user inputs thus may be integrally formed in a bezel portion or in a casing portion or housing portion of the mirror assembly, without affecting the scope of the present invention. Optionally, the mirror assembly may comprise other types of casings or bezel portions or the like, such as described in U.S. Pat. Nos. 6,439,755; 4,826,289; 6,756,912; and 6,501,387; and/or U.S. patent applications, Ser. No. 10/933,842, filed Sep. 3, 2004 by Kulas et al. for INTERIOR REARVIEW MIRROR ASSEMBLY; Ser. No. 10/993,302, filed Nov. 19, 2004 by Lynam for MIRROR REFLECTIVE ELEMENT FOR A VEHICLE; and/or Ser. No. 11/021,065, filed Dec. 23, 2004 by McCabe et al. for ELECTRO-OPTIC MIRROR CELL, and/or PCT Application No. PCT/US2004/015424, filed May 18, 2004 by Donnelly Corp. et al. for MIRROR ASSEMBLY FOR VEHICLE, and published on Dec. 2, 2004 as PCT Publication No. WO 2004/103772 A2, and/or U.S. provisional applications, Ser. No. 60/471,546, filed May 19, 2003; Ser. No. 60/525,537, filed Nov. 26, 2003; and Ser. No. 60/556,259, filed Mar. 25, 2004, which are all hereby incorporated herein by reference.

The casing of the mirror assembly thus may include a bezel portion that attaches to or snaps to the rear casing portion, with the human machine interface at the bezel portion of the casing or elsewhere at the casing. The reflective element may be disposed within the casing, such as at the bezel portion of the casing. For example, for a prismatic mirror assembly, the bezel portion and the rest of the casing can be molded around the reflective element, or a separate bezel portion can be made and the reflective element attached thereto, and a cap portion or rear casing portion may be attached to the bezel portion, the combination forming the casing, such as by utilizing aspects disclosed in PCT Application No. PCT/US2004/015424, filed May 18, 2004 by Donnelly Corp. et al. for MIRROR ASSEMBLY FOR VEHICLE, and published on Dec. 2, 2004 as PCT Publication No. WO 2004/103772 A2, which is hereby incorporated herein by reference.

The bezel or casing, including the user input or inputs, thus may be formed of the same polymeric and/or resinous material, and may be formed during the same molding process that forms the bezel portion and/or casing. The narrowed tabs 16b of the inputs may connect the inputs to the bezel or casing, and may flex or function as a living hinge to allow movement of the button portion 16a relative to the bezel or casing so that the user input may move to actuate or operate the element or switch within the mirror assembly. Optionally, the user actuatable inputs may comprise plastic or polymeric or resinous inputs that are moved to actuate or operate the element or switch of the circuitry, or the user actuatable input may house or contain a touch sensor or proximity sensor element (such as the types described below) within a portion of the user actuatable input (such as a proximity sensor insert molded within the button portion or body portion of the user actuatable input), without affecting the scope of the present invention.

Thus, for example, the human machine interface or user interface may be integrally molded during the formation of the mirror casing and/or bezel portion of the casing (for applications where the casing consists of, for example, a bezel portion that snaps or attaches to a rear casing or housing portion to form the mirror casing). For example, the likes of a proximity sensor and/or other sensor or user input or accessory or entity may be placed into an injection mold and molten plastic polymeric resinous material may be injected (or otherwise disposed or introduced) into the mold to integrally mold or form or join or integrate the bezel portion or casing portion and the entity (such as described above) inserted or placed in the mold tool during the same molding process. After the resinous material has cooled/cured and the part is removed from the mold, the user actuatable input is integral with the casing or bezel portion.

The interior rearview mirror assembly may be adjustably mounted to an interior surface or portion of the vehicle, such as to an interior surface of the vehicle windshield or to a header portion of the vehicle or the like, and such as via any mounting arm and button or any other mounting arrangement, such as via the mounting assemblies or mounting arrangements of the types described in U.S. Pat. Nos. 6,318,870; 5,671,996; 5,813,745; 5,673,994; 5,820,097; 5,708,410; 5,576,687; 5,521,760; 5,330,149; 5,100,095; 5,058,851; 4,930,742; 4,936,533; 4,436,371; 4,524,941; 4,435,042; and/or 4,646,210, and/or U.S. provisional applications, Ser. No. 60/609,642, filed Sep. 14, 2004; Ser. No. 60/624,091, filed Nov. 1, 2004; and Ser. No. 60/638,250, filed Dec. 21, 2004, which are all hereby incorporated by reference herein. Referring now to FIGS. 2, 2A and 2B, a human machine interface includes at least one user actuatable input or actuator or button 116 of an interior rearview mirror assembly 110. The user input or inputs may be integrally formed or molded with a bezel 112 during the molding of the bezel, and may include a button portion 116*a* and one or more flexible tabs or connecting elements 116*b*, similar to the user input 16 of mirror assembly 10, discussed above. User input 116 may include an actuator insert 122 that may be insert molded at and partially in button portion 116*a*, as best shown in FIG. 2A. User input 116 is otherwise similar to user input 16, described above, and includes a pin or arm or extension 116*c* for actuating an element or switch 118 on a printed circuit board 120. Optionally, and with reference to FIG. 2B, the actuator insert 122' may include the pin or arm or extension 122*c* for actuating the element or switch 118 when the button portion 116*a*' is depressed.

Actuator insert 122 may be any desired shape and may include a panel portion or viewable portion 122*a* and a tab or insert portion 122*b* that is insert molded within button portion 116*a* to retain insert 122 on button portion 116*a*, as best shown in FIG. 2A. The insert portions 122*b* may extend outwardly from the panel portion 122*a* and may be positioned within a portion of the mold cavity during molding of the bezel, such that the bezel is molded around the insert portions to adhere to or bond to the insert portions, and/or the insert portions are otherwise retained in the inputs and bezel portion, such as by mechanical interlocking of the bezel material and the connecting elements 122*b* during molding and curing of the bezel, in order to secure or retain the inserts in the buttons or inputs 116 and bezel 112. The inserts may be positioned at the desired/appropriate location in the mold cavity and the plastic or polypropylene material may be shot into the mold to mold the bezel and to mold the button portion or portions around the insert or inserts. Preferably, the bezel (with the integrally formed actuator and insert) is molded via a one-shot or single shot molding process. However, the bezel may be molded via a two-shot or double-shot molding process or other molding processes, without affecting the scope of the present invention.

Optionally, panel portion 122*a* of actuator insert 122 may have text or characters or graphics or icons or other indicia printed or formed thereon to indicate the function of the button or user input, if desired. Optionally, actuator insert 122 may comprise a thin panel portion or a partially transparent or translucent panel portion or material, and printed circuit board 120 may include an illumination source 124 to back light or provide illumination to and through panel portion 122*a* to enhance visibility of the user input 116. Optionally, the illumination source 124 may be activated to emit such illumination when the button is depressed to indicate to the user that the PCB element or switch 118 on the printed circuit fluorescent (VF) element, a liquid crystal display (LCD) element, a light emitting diode (LED), such as an inorganic LED or an organic light emitting diode (OLED), such as disclosed in U.S. Pat. Nos. 6,690,268 and 6,428,172 and in U.S. patent application, Ser. No. 10/054, 633, filed Jan. 22, 2002, now U.S. Pat. No. 7,195,381, which are hereby incorporated herein by reference, an electroluminescent (EL) element or the like, without affecting the scope of the present invention.

Figure 3A:
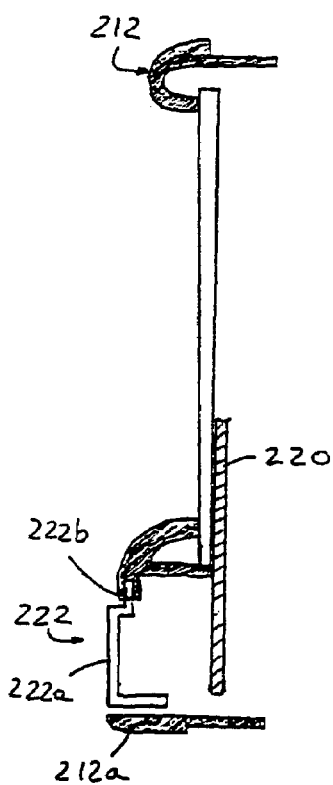
FIG. 3A is a sectional view of the interior rearview mirror assembly taken along the line A—A in FIG. 3.
Figures 3B, 3C:
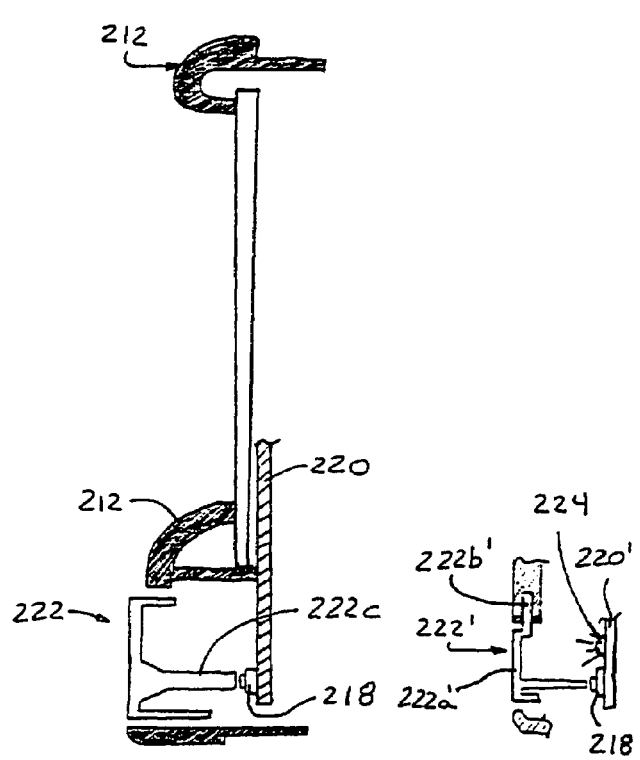
FIG. 3B is a sectional view of the interior rearview mirror assembly taken along the line B—B in FIG. 3.
FIG. 3C is a sectional view similar to FIG. 3B of another actuator or input of the present invention.

Optionally, and with reference to FIGS. 3, 3A and 3B, a human machine interface includes at least one user input or button 216 of an interior rearview mirror assembly 210. The user input or inputs may comprise an actuator insert 222 that is insert molded partially within a chin portion 212*a* of a bezel 212 during the molding of the bezel. Actuator insert 222 may include a button portion 222*a* and one or more flexible tabs or connecting elements 222*b*, similar to button 16 of mirror assembly 10, discussed above. The tabs or connecting elements 222*b* may be molded into the bezel 212 to retain insert 222 to the bezel 212, and may be flexible to allow for movement of button portion or push pad portion 222*a* relative to bezel 212. The pads or tabs or connecting elements 222*b* may comprise a thin strip of material for the bezel material to adhere or bond to, and/or the insert portions may be otherwise retained in the bezel portion, such as by mechanical interlocking of the bezel material and the connecting elements 222*b* during molding and curing of the bezel, in order to secure or retain the inserts at and in the molded bezel. As shown in FIG. 3B, actuator insert 222 includes a pin or extension 222*c* for actuating an element or switch 218 on a printed circuit board 220. Actuator insert 222 may otherwise be substantially similar to user input 116 and actuator insert 122, discussed above, such that a detailed discussion of the insert and button will not be repeated herein.

Optionally, and as can be seen in FIG. 3C, the tab or connecting element 222*b*' of an actuator insert 222' may extend at least partially along the upper portion of the insert 222'. Optionally, the insert 222' may comprise a thin panel portion or a partially transparent or translucent panel portion or material, and the printed circuit board 220' may include an illumination source 224 to back light or provide illumination to and through button or panel portion 222*a*' to enhance visibility of the user input or button or insert 222' or to provide visual confirmation of actuation of the PCB element or switch, as discussed above.

Figure 4:
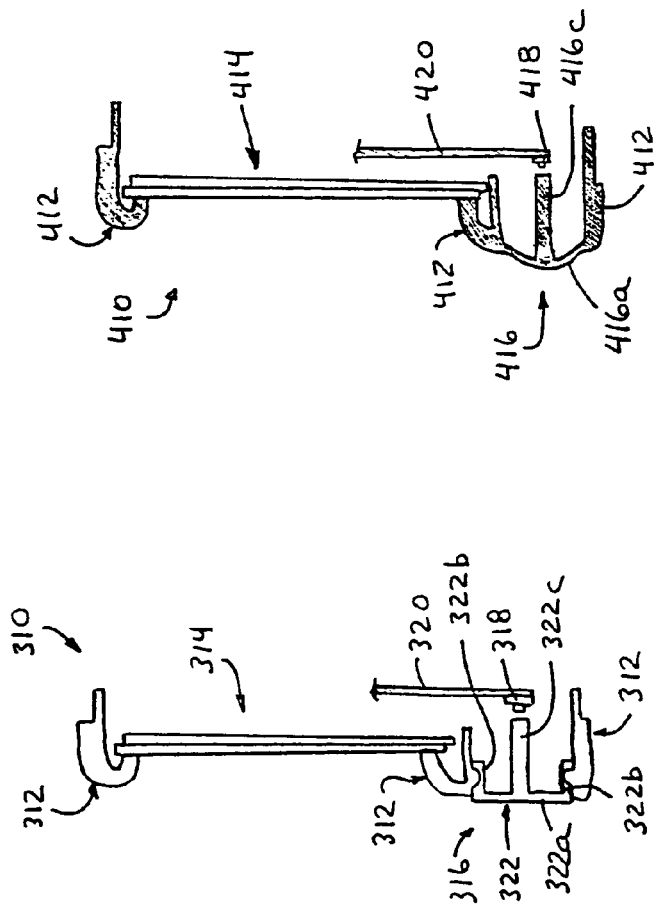
FIG. 4 is a sectional view of another interior rearview mirror assembly taken generally along a centerline of a user input or actuator of the present invention.

Optionally, and with reference to FIG. 4, a human machine interface may include at least one manual input or user actuatable input or actuator 316 that includes an actuator insert 322 that is insert molded in the chin portion 312*a* of the bezel 312 of an interior rearview mirror assembly 310, which also includes a reflective element 314. The insert 322 may include a panel portion or button portion or push pad 322a and tabs or connecting elements 322b that are molded in or adhered or bonded to or mechanically secured to the bezel 312. Push pad 322a may comprise a thin, flexible portion of insert 322 and may include a pin or arm or extension 322c extending into the bezel and toward a PCB element or switch 318 on a printed circuit board 320, such that pressing against the push pad 322a causes pin 322c to engage and actuate the element or switch 318 to perform the desired function. The insert 322 may comprise a flexible material that may be insert molded within the bezel during molding of the bezel and retained therein, such as in the manner described above. The insert 322 may have a thickness that allows for flexing of the push pad portion 322a, and may be thick enough to provide a "bump-in/bump-out" click or feel to the push pad when it is depressed and released by a user. Optionally, the insert 322 may comprise a translucent material and the printed circuit board may include an illumination source, such as described above, to back light the icon or logo or indicia or the like on the push pad portion of the insert or user input, without affecting the scope of the present invention. The illumination source may be activated to back light the insert when other interior lights are activated, so as to provide illumination of the insert during darkened or nighttime conditions, or the illumination source may be activated to back light the insert when the input or actuator is depressed by a user to confirm successful actuation of the element or switch, or the illumination source may be activated during other situations, without affecting the scope of the present invention. The user input or actuator thus may preferably provide an audible or tactile or visible or haptic acknowledgement of successful element/switch actuation to the driver or occupant using the user input or actuator. The mirror assembly and user input may otherwise be substantially similar to the mirror assemblies and user inputs described above, such that a detailed discussion of the mirror assembly and user input will not be repeated herein.

Figure 6:
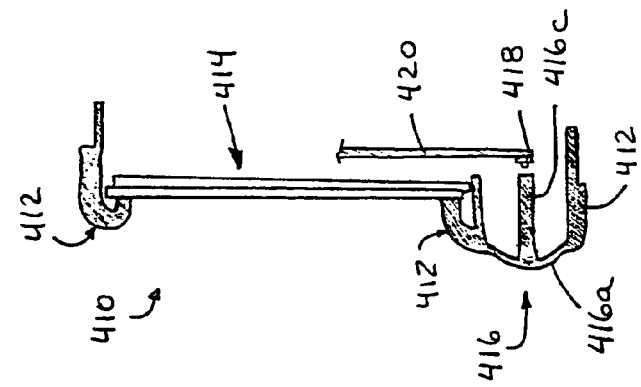
FIG. 6 is a sectional view similar to FIG. 5, with a push pad portion of the user input or actuator depressed to actuate the PCB switch in accordance with the present invention.
Figure 5:
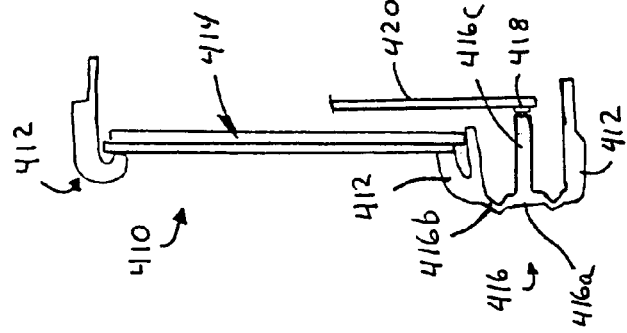
FIG. 5 is a sectional view similar to FIG. 4 of another rearview mirror assembly in accordance with the present invention.

Optionally, and with reference to FIG. 5, a human machine interface may include at least one user input or user actuatable input 416, which may be integrally formed or molded in the chin portion 412a of the bezel 412 during molding of the bezel 412 of an interior rearview mirror assembly 410, which also includes a reflective element 414. The user input 416 may include a panel portion or button portion or push pad 416a, and may comprise a diaphragm button or bubble button or actuator. Push pad 416a may comprise a thin, flexible portion of user input 416 and may have a pin or arm or extension 416c extending into the bezel and toward a PCB element or switch 418 on a printed circuit board 420, such that pressing against the push pad 416a causes pin 416c to engage and actuate the element or switch 418 to perform the desired function. The button portion or push pad 416a thus may be substantially thin and flexible to allow for inward and outward flexing of the button portion when it is pressed and released by a user. The thin button portion 416a, or at least the outer regions 416b of the button portion 416a, thus may function as a living hinge to facilitate inward and outward movement of the button portion 416a and/or the pin 416c as the button portion 416a is pressed and released by a user, as can be seen in FIG. 6. As shown in FIG. 5, the button portion may be bubble or convex-shaped to provide a raised button portion along the bezel that a user will readily recognize as a button or actuator. Optionally, the button portion or living hinge portion may be thick enough to provide a "bump-in/bump-out" click or feel to the push pad or button portion when it is depressed and released by a user. Optionally, the button portion may be substantially thin and/or may comprise a translucent material and the printed circuit board may include an illumination source, such as described above, to back light the icon or logo or indicia or the like on the push pad portion of the user input, without affecting the scope of the present invention. The mirror assembly and user input may otherwise be substantially similar to the mirror assemblies and user inputs described above, such that a detailed discussion of the mirror assembly and user input will not be repeated herein.

Figure 7:
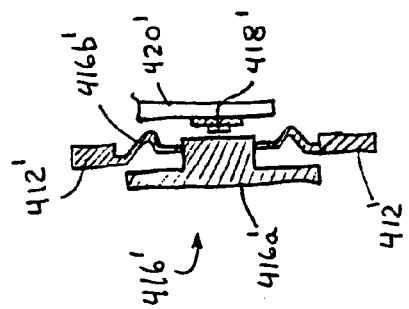
FIG. 7 is a sectional view of another actuator or input integrally formed with a bezel in accordance with the present invention.

Optionally, and as shown in FIG. 7, a push pad 416a' of a user input 416' of a human machine interface at an interior rearview mirror assembly may provide an enlarged and/or raised pad area for a user to press, while the living hinge portion 416b' may be positioned behind the pad area and integrally molded with the push pad portion 416a' and the bezel 412' during the molding process. In the illustrated embodiment of FIG. 7, the push pad 416a' is positioned close to the PCB element or switch 418' on the printed circuit board 420', such that no pin or extension is required to reach and engage the PCB element or switch to actuate the switch as the push pad is depressed by a user.

Figure 8:
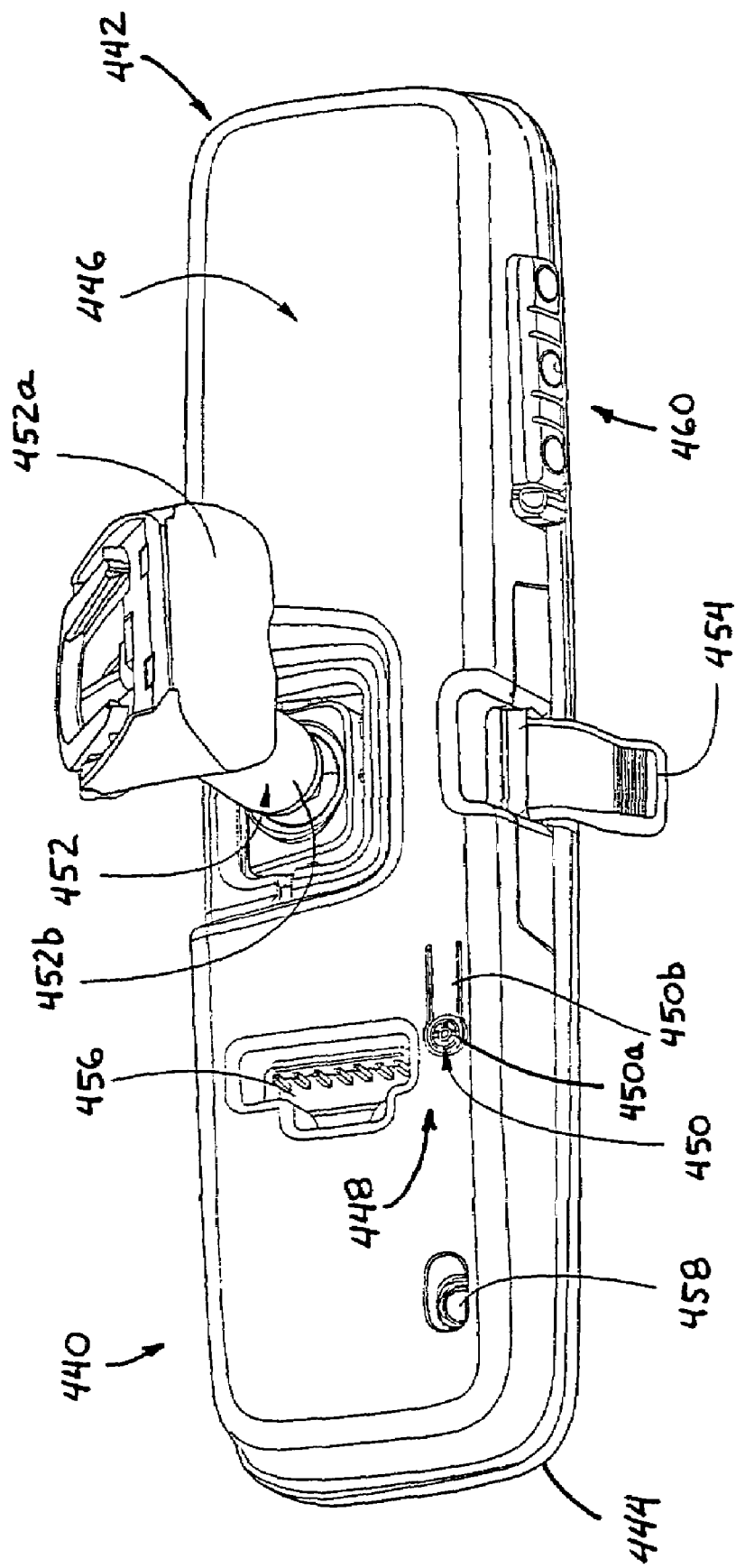
FIG. 8 is a rear perspective view of another interior rearview mirror assembly incorporating a human machine interface in accordance with the present invention.

Optionally, a human machine interface and user actuatable input may be integrally formed or molded at other portions of the mirror casing, without affecting the scope of the present invention. For example, a human machine interface may be integrally molded at a rear or back portion of a mirror casing or at a cap portion of a mirror assembly, without affecting the scope of the present invention. For example, and such as shown in FIG. 8, an interior rear view mirror assembly 440 includes a mirror casing 442 that includes a front bezel portion 444 and a rear cap portion 446, such as described in PCT Application No. PCT/US2004/015424, filed May 18, 2004 by Donnelly Corp. et al. for MIRROR ASSEMBLY FOR VEHICLE, and published on Dec. 2, 2004 as PCT Publication No. WO 2004/103772 A2, which is incorporated herein by reference. The cap portion 446 includes a human machine interface 448 having a user actuatable input or button or control 450. The user actuatable input may be pressed by a user to contact or actuate a button or switch or control or element of circuitry of the mirror assembly, such as an element or switch of compass circuitry on a circuit board within the mirror assembly.

The circuitry on the circuit board thus may include a button or switch or control or element that is actuatable by the user actuatable input or button or control 450, such as at the rear of the cap portion 446 or at the rear of the mirror holder, such as, for example, for actuating a calibration or zone function of compass circuitry within the mirror assembly. The user actuatable input 450 may include an inward protrusion that extends forwardly from a body portion or button portion or actuated portion 450a of the user actuatable input 450 and forwardly from the cap portion 446 or inwardly toward the element or switch or control on the circuit board when the cap portion 446 is positioned at the circuit board. The body or button or actuated portion 450a is integrally formed at an end of a flexible tab 450b, which is integrally formed with and extending partially along the cap portion 446. When a user presses at the body portion 450a of user actuatable input 450, the tab 450b flexes and the body portion 450a (and a contacting portion or protrusion on the inward side of the body portion) is moved toward and urged against the element or switch on the circuit board to actuate the element or switch to control or activate/deactivate the associated function of the compass circuitry (or other circuitry or accessory or the like that may be associated with the element or switch on the circuit board). Although shown and described as being integrally formed with a single cap or casing portion 446, the button/flexible tab or flip actuation tab member may be integrally formed on one of opposite side cap portions or end portions or the like (such as described in PCT Application No. PCT/US2004/015424, filed May 18, 2004 by Donnelly Corp. et al. for MIRROR ASSEMBLY FOR VEHICLE, and published on Dec. 2, 2004 as PCT Publication No. WO 2004/103772 A2 (which is hereby incorporated herein by reference), or on other types of casings or housings or the like, without affecting the scope of the present invention.

In the illustrated embodiment, mirror assembly 440 includes a mounting assembly 452 for adjustably mounting the mirror casing or mirror head to an interior surface or portion of the vehicle, such as via a mounting base 452a that attaches to a mirror mounting button or the like at an interior surface of the vehicle windshield. The mirror assembly comprises a prismatic mirror assembly and has a toggle member or flip tab 454 for adjusting the prismatic mirror reflective element relative to the mounting arm 452b, such as is known in the mirror arts. The circuit board or circuitry of the mirror assembly 440 may be electrically connected to a wiring harness or the like via an electrical connector 456 that is accessible at the rear of the mirror assembly for connection to the wiring harness. Optionally, the circuit board may also have an ambient light sensor or photocell 458 for detecting the ambient light level at the mirror assembly, whereby the circuitry may adjust the intensity of a display in response to the detected ambient light levels. The ambient light sensor 458 is positioned at a corresponding opening in the cap portion 446 to allow the ambient light sensor to detect the ambient light levels through the opening. The mirror assembly may include other accessories or elements or circuitry or other user actuatable inputs, such as the types described above or other inputs 460 or the like, such as for activating/deactivating/controlling an electronic accessory or feature or element or the like of or associated with the mirror assembly.

The cap portion may be positioned at an opening of the mirror holder, such that the accessories or circuitry supported by the cap portion are positioned generally within the mirror holder. Optionally, the unitary cap portion may snap onto or otherwise secure to the mirror holder and generally cover or define the rear portion of the mirror assembly when so assembled. The cap portion thus supports the circuit board or circuit boards and associated circuitry and/or accessories at or within the mirror assembly, such as described in PCT Application No. PCT/US2004/015424, filed May 18, 2004 by Donnelly Corp. et al. for MIRROR ASSEMBLY FOR VEHICLE, and published on Dec. 2, 2004 as PCT Publication No. WO 2004/103772 A2, which is hereby incorporated herein by reference.

Optionally, the circuit boards or accessories may be provided at, within or on the cap portion at a cap portion manufacturing facility or electrical accessory manufacturing facility, such that the cap portion and circuitry assemblies are provided as a unit to the mirror assembly facility or plant. The cap portion and circuitry units may then be snapped or otherwise affixed to the mirror holder or reflective element assembly portion of an appropriate mirror assembly having features or components or displays corresponding to the cap portion and circuitry units, as discussed below. The assembly or back-loading of the cap portions to the mirror holder and reflective element assembly portion thus may be performed remote from the molding tool for molding the mirror holder, since the cap portions may be mounted to the mirror holder after the mirror holder has cooled and shrunk.

Each cap portion may support one or more desired accessories or circuit boards for providing the desired feature to the mirror assembly. The cap portion or portions, and corresponding accessory or feature or electrical content, may be selected and attached to a universal or common mirror holder to provide different features to the mirror depending on the options selected for a particular application or vehicle. Optionally, the cap portions may be selected/configured to have accessories contained/supported therein to correspond to and be aligned with/juxtapositioned with one or more displays of a particular or respective reflective element secured in the common mirror holder and/or may correspond with a particular mirror holder for applications where the accessory includes buttons or controls which may extend through openings or recesses in the mirror holder for access thereto by the driver or occupant of the vehicle, such as described in PCT Application No. PCT/US2004/015424, filed May 18, 2004 by Donnelly Corp. et al. for MIRROR ASSEMBLY FOR VEHICLE, and published on Dec. 2, 2004 as PCT Publication No. WO 2004/103772 A2, which is hereby incorporated herein by reference.

Although shown and described as push button type inputs or actuators, it is envisioned that other types of human machine interfaces and/or actuators may be integrally formed with or integrally molded with or insert molded with the bezel (or casing or the like) of a mirror assembly or accessory module/windshield electronics module or the like during the molding of the bezel or casing, without affecting the scope of the present invention. For example, the integrally formed or molded or insert molded actuator may comprise a toggle type actuator that may be pressed at either side to pivot or toggle or rock the actuator to engage and actuate a corresponding PCB element or switch positioned behind either side of the toggle actuator. The toggle or rocker switch may be integrally molded with the bezel during molding of the bezel, and may include tabs or connecting elements generally at a central region of the toggle, such that the tabs may flex to allow the toggle to be pressed or rocked toward either side to actuate the desired respective PCB element or switch. Other types of actuators may be implemented, without affecting the scope of the present invention.

Optionally, other elements besides human machine interface elements may be integrally molded at or within a portion of the casing of the mirror assembly. For example, other electronic accessories or modules or elements, such as, for example, a microphone module or element, an antenna module or element, a lighting module or element, a lens module or element, an optical module or element, and/or the like, may be integrally molded at a portion of the mirror casing as described above.

The material selected for the bezel and/or the inputs or actuators or buttons may comprise a flexible material to facilitate movement of the actuator relative to the rest of the bezel. Optionally, the material of the button or actuator may be colored or shaped as desired, and may provide a raised push pad region, and may have printing or text or icons or logos or other indicia formed or printed thereon, without affecting the scope of the present invention. Optionally, the exterior surface or face of the button or actuator may have a different texture than the bezel or casing to differentiate the button or actuator from the bezel. Optionally, the button or actuator material may comprise a soft touch material or a soft touch surface or portion, such as disclosed in U.S. Pat. No. 6,318,870, which is hereby incorporated herein by reference.

Therefore, the manual inputs or user actuatable inputs or buttons or the like of the present invention may be integrally formed or molded with the bezel and/or the rest of the casing of the mirror assembly during molding of the bezel and/or the rest of the casing, or may be insert molded within the bezel and/or the rest of the casing of the mirror assembly during molding of the bezel and/or the rest of the casing, such that the user inputs or buttons are incorporated into the bezel and/or the rest of the casing and do not have to be supplied as a separate component of the bezel and/or the rest of the casing and/or mirror assembly. The integral inputs or actuators or buttons or toggles or the like of the present invention thus reduce the manufacturing processes or steps in manufacturing and assembling the mirror assembly. The inputs or actuators of the present invention may provide a desired human-machine interface (HMI) feel and touch, and may provide an enhanced aesthetic appearance to the mirror assembly. Optionally, the integral inputs or actuators or buttons or toggles or the like may be integrally formed or molded or insert molded in a casing or housing portion of the mirror assembly or in a casing or housing portion of an accessory module or windshield electronics module or pod or attachment during molding of the casing or housing portion, without affecting the scope of the present invention.

Optionally, and with reference to FIGS. 9–11, an interior rearview mirror assembly 510 includes a casing 511, a bezel 512 and a reflective element 514, and a human machine interface having at least one manual input or user actuatable input or actuator 516, such as a button or toggle or the like at bezel 512. User actuatable inputs 516 are movably positioned at casing 511 and/or bezel 512, such as at or adjacent to a chin portion 512a of bezel 512 (or elsewhere around the bezel). Mirror assembly 510 includes at least one electronic element or switch 518, which may be positioned within the mirror casing. For example, the element or switch 518 may comprise a PCB-mountable microswitch that may be mounted on or at a printed circuit board (PCB) 520 or the like positioned within the mirror casing. As shown in FIG. 9, PCB element or switch or switches 518 may be positioned at a rearward side 520a of printed circuit board 520, and user input 516 may extend generally along the printed circuit board 520 and adjacent to a respective element or switch 518. Actuation of user input 516, such as via pushing or pressing user input 516 in the direction of the arrow A (FIG. 9), causes user input to move and/or flex to actuate the element or switch 518, as discussed below.

Similar to elements/switches 18, discussed above, electronic elements/switches 518 may be operable or actuatable to activate/deactivate or adjust or control an electrical accessory or component or feature or the like (such as the accessories or systems discussed below) associated with the printed circuit board or with the rearview mirror assembly or with the vehicle. The accessory or component or feature may be incorporated onto the printed circuit board 520 or may be positioned elsewhere in or at the mirror assembly or elsewhere in or at the vehicle, such as in an accessory module or windshield electronics module or the like, such as an accessory module or windshield electronics module of the type described in U.S. Pat. Nos. 6,824,281; 6,690,268; 6,250,148; 6,341,523; 6,593,565; and 6,326,613, which are all hereby incorporated herein by reference. Optionally, the user input or buttons may be positioned at a casing or housing of an accessory module or windshield electronics module or the like and may be actuatable or depressible to actuate an electronic element or switch incorporated into the accessory module or windshield electronics module or the like, without affecting the scope of the present invention.

As shown in FIG. 9, user input 516 may comprise an elongated lever arm with a downward extending exposed portion 516a (that is exposed or outside of the casing 511 and that is viewable and accessible by a user in the vehicle) and an element/switch actuating portion 516b within the casing 511. Casing 511 includes an opening or slot 511a through which user input 516 extends. User input 516 is formed such that when exposed portion 516a is pressed or moved by a user in the direction of the arrow A, a pivot portion 516c of user input 516 engages casing 511 at slot 511a to limit movement of the user input 516. When the user presses user input 516, the input or lever may pivot about the contact point or pivot point 517 between the casing 511 and pivot portion 516c to cause the element/switch actuating portion 516b to move forward (or to the right in FIG. 9) to engage and actuate the element or switch 518. When the user input 516 is released, the element/switch actuating portion 516b may move back to its initial position.

In the illustrated embodiment, the user input 516 includes a stop member or end 516d that may be generally at or may contact the printed circuit board 520 to limit movement of switch actuating portion 516b when user input 516 is actuated. During actuation of user input 516, stop end 516d limits forward movement of the upper or inner portion of the user input, whereby switch actuating portion 516b may flex to contact and actuate the element or switch 518. The mirror assembly 510 may also include a biasing member or cushioning member 522, which functions to bias or hold user input 516 in its non-actuated position or orientation when it is released. Biasing member 522 may press or bias or urge the switch actuating portion 516b toward the circuit board 520 so that stop end 516d is urged against the circuit board when the user input is released or not-actuated. The biasing member may comprise a foam spring or other type of spring or cushioning member or device, without affecting the scope of the present invention.

Optionally, mirror assembly 510 may include an illumination source 524 positioned on printed circuit board 520 and operable to illuminate the exposed portion 516a of user input 516. In the illustrated embodiment, illumination source 524 is positioned at end 516d of user input 516 and directs illumination toward and into end 516d of user input 516. User input 516 may comprises a plastic or polymeric material (such as a transparent or semi-transparent polymeric material) that is capable of transmitting light therealong or may comprise a light pipe or the like for transmitting the light from illumination source 520 along user input 516 to exposed portion 516a. The light from illumination source 520 thus may illuminate the exposed portion 516a of user input 516 to enhance viewability of the user input during darkened or nighttime conditions. As shown in FIGS. 10 and 11, the exposed portions 516a of the user inputs 516 may include icons or indicia or text or other graphics or the like printed or screened or otherwise formed thereon to identify the function of the switch associated with the user input to a user or occupant of the vehicle.

The user input of the present invention thus may comprise an elongated plastic or polymeric member that may be configured to pivot or flex relative to the mirror casing or the like to actuate an element or switch positioned within the casing, such as at a printed circuit board of the mirror assembly. The user input thus may not include moving parts or hinges or springs or the like typically associated with user actuatable switches or buttons or toggles or the like, and thus may provide a low cost user input or button or the like that is readily installable in or at a mirror assembly (or in or at an accessory module or windshield electronics module or the like) of a vehicle. The user input may be implemented in a mirror assembly having a casing and bezel portion, such as the types described in U.S. Pat. Nos. 6,439,755; 4,826,289; and 6,501,387; and/or U.S. patent applications, Ser. No. 10/933,842, filed Sep. 3, 2004 by Kulas et al. for INTERIOR REARVIEW MIRROR ASSEMBLY; Ser. No. 10/993,302, filed Nov. 19, 2004 by Lynam for MIRROR REFLECTIVE ELEMENT FOR A VEHICLE; and/or Ser. No. 11/021,065, filed Dec. 23, 2004 by McCabe et al. for ELECTRO-OPTIC MIRROR CELL, and/or PCT Application No. PCT/US2004/015424, filed May 18, 2004 by Donnelly Corp. et al. for MIRROR ASSEMBLY FOR VEHICLE, and published on Dec. 2, 2004 as PCT Publication No. WO 2004/103772 A2, which are all hereby incorporated herein by reference.

As shown in FIGS. 1–3, 8 and 9, the reflective element of the mirror assembly may comprise a prismatic reflective element and the mirror assembly thus may comprise a prismatic mirror assembly, such as a prismatic mirror assembly of the types described in U.S. Pat. Nos. 6,318,870; 5,327,288; 4,948,242; 4,826,289; 4,436,371; and 4,435,042, which are hereby incorporated herein by reference. Optionally, the prismatic reflective element may comprise a conventional prismatic reflective element or prism or may comprise a prismatic reflective element of the types described in PCT Application No. PCT/US03/29776, filed Sep. 19, 2003 by Donnelly Corp. et al. for MIRROR REFLECTIVE ELEMENT ASSEMBLY, and published on Apr. 1, 2004 as PCT Publication No. WO 2004/026633 A2; and U.S. patent applications, Ser. No. 10/933,842, filed Sep. 3, 2004 by Kulas et al. for INTERIOR REARVIEW MIRROR ASSEMBLY; Ser. No. 10/993,302, filed Nov. 19, 2004 by Lynam for MIRROR REFLECTIVE ELEMENT FOR A VEHICLE; and/or Ser. No. 11/021,065, filed Dec. 23, 2004 by McCabe et al. for ELECTRO-OPTIC MIRROR CELL; and/or Ser. No. 10/709,434, filed May 5, 2004 by Lynam for MIRROR REFLECTIVE ELEMENT, and/or PCT Application No. PCT/US2004/015424, filed May 18, 2004 by Donnelly Corp. et al. for MIRROR ASSEMBLY FOR VEHICLE, and published on Dec. 2, 2004 as PCT Publication No. WO 2004/103772 A2, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 6,227,675; 6,229,319; and 6,315,421 (the entire disclosures of which are hereby incorporated by reference herein), that can benefit from the present invention.

Optionally, and as shown in FIGS. 4–6, the reflective element of the mirror assembly may comprise an electro-optic or electrochromic reflective element, such that the mirror assembly may comprise an electro-optic or electrochromic mirror assembly. For example, the electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", *SAE Technical Paper Series* 870636 (1987); N. R. Lynam, "Smart Windows for Automobiles", *SAE Technical Paper Series* 900419 (1990); N. R. Lynam and A. Agrawal, "Automotive Applications of Chromogenic Materials", *Large Area Chromogenics: Materials and Devices for Transmittance Control*, C. M. Lampert and C. G. Granquist, EDS., Optical Engineering Press, Wash. (1990), which are hereby incorporated by reference herein; and/or as described in U.S. patent application, Ser. No. 10/054,633, filed Jan. 22, 2002 by Lynam et al. for VEHICULAR LIGHTING SYSTEM, now U.S. Pat. No. 7,195,381, which are hereby incorporated herein by reference. The mirror assembly may include one or more other displays, such as the types disclosed in U.S. Pat. Nos. 5,530,240 and/or 6,329,925, which are hereby incorporated herein by reference, and/or display-on-demand transflective type displays, such as the types disclosed in U.S. Pat. Nos. 6,690,268; 5,668,663 and/or 5,724,187, and/or in U.S. patent applications Ser. No. 10/054,633, filed Jan. 22, 2002 by Lynam et al. for VEHICULAR LIGHTING SYSTEM, now U.S. Pat. No. 7,195,381; and/or Ser. No. 11/021,065, filed Dec. 23, 2004 by McCabe et al. for ELECTRO-OPTIC MIRROR CELL; and/or PCT Application No. PCT/US03/29776, filed Sep. 9, 2003 by Donnelly Corp. et al. for MIRROR REFLECTIVE ELEMENT ASSEMBLY, and published on Apr. 1, 2004 as PCT Publication No. WO 2004/026633 A2; and/or PCT Application No. PCT/US03/35381, filed Nov. 5, 2003 by Donnelly Corp. et al. for ELECTRO-OPTIC REFLECTIVE ELEMENT ASSEMBLY, and published on May 21, 2004 as PCT Publication No. WO 2004/042457 A2; and/or PCT Application No. PCT/US03/40611, filed Dec. 19, 2003 by Donnelly Corp. et al. for ACCESSORY SYSTEM FOR VEHICLE, and published on Jul. 15, 2004 as PCT Publication No. WO 2004/058540 A2, and/or U.S. provisional applications, Ser. No. 60/630,061, filed Nov. 22, 2004 by Lynam et al. for MIRROR ASSEMBLY WITH VIDEO DISPLAY; Ser. No. 60/629,926, filed Nov. 22, 2004 by McCabe et al. for METHOD OF MANUFACTURING ELECTRO-OPTIC MIRROR CELL; Ser. No. 60/531,838, filed Dec. 23, 2003; Ser. No. 60/553,842, filed Mar. 17, 2004; and Ser. No. 60/563,342, filed Apr. 19, 2004, which are all hereby incorporated herein by reference. The thicknesses and materials of the coatings on the substrates of the electrochromic reflective element, such as on the third surface of the reflective element assembly, may be selected to provide a desired color or tint to the mirror reflective element, such as a blue colored reflector, such as is known in the art and such as described in U.S. Pat. Nos. 5,910,854 and 6,420,036, and in PCT Application No. PCT/US03/29776, filed Sep. 9, 2003 by Donnelly Corp. et al. for MIRROR REFLECTIVE ELEMENT ASSEMBLY, and published on Apr. 1, 2004 as PCT Publication No. WO 2004/026633 A2, which are all hereby incorporated herein by reference.

The manual inputs or user actuatable inputs or actuators may control or adjust or activate/deactivate one or more accessories or elements or features. Optionally, the mirror assembly may include one or more accessories incorporated onto the printed circuit board or positioned elsewhere at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot or object detection system, such as imaging or detection systems of the types disclosed in U.S. Pat. Nos. 5,929,786 and/or 5,786,772, and/or U.S. patent application, Ser. No. 10/427,051, filed Apr. 30, 2003 by Pawlicki et al. for OBJECT DETECTION SYSTEM FOR VEHICLE, now U.S. Pat. No. 7,038,577, and/or U.S. provisional applications, Ser. No. 60/628,709, filed Nov. 17, 2004 by Camilleri et al. for IMAGING AND DISPLAY SYSTEM FOR VEHICLE; Ser. No. 60/614,644, filed Sep. 30, 2004; Ser. No. 60/618,686, filed Oct. 14, 2004 by Laubinger for VEHICLE IMAGING SYSTEM; Ser. No. 60/638,687, filed Dec. 23, 2004 by Higgins-Luthman for OBJECT DETECTION SYSTEM FOR VEHICLE, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093; and/or U.S. provisional applications, Ser. No. 60/607,963, filed Sep. 8, 2004 by Schofield for IMAGING SYSTEM FOR VEHICLE; and Ser. No. 60/562,480, filed Apr. 15, 2004 by Schofield for IMAGING SYSTEM FOR VEHICLE, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897; and/or PCT Application No. PCT/US03/40611, filed Dec. 19, 2003 by Donnelly Corp. et al. for ACCESSORY SYSTEM FOR VEHICLE, and published on Jul. 15, 2004 as PCT Publcation No. WO 2004/058540 A2, and/or U.S. provisional applications, Ser. No. 60/630,061, filed Nov. 22, 2004 by Lynam et al. for MIRROR ASSEMBLY WITH VIDEO DISPLAY, a remote keyless entry receiver or system or circuitry and/or a universal garage door opening system or circuitry (such as the types disclosed in U.S. Pat. Nos. 6,396,408; 6,362,771; 5,798,688 and 5,479,155, and/or U.S. patent application, Ser. No. 10/770,736, filed Feb. 3, 2004 by Baumgardner et al. for GARAGE DOOR OPENING SYSTEM FOR VEHICLE, now U.S. Pat. No. 7,023, 322, lights, such as map reading lights or one or more other lights or illumination sources, such as disclosed in U.S. Pat. Nos. 6,690,268; 5,938,321; 5,813,745; 5,820,245; 5,673, 994; 5,649,756; 5,178,448; 5,671,996; 4,646,210; 4,733, 336; 4,807,096; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381, microphones, such as disclosed in U.S. Pat. Nos. 6,717,524; 6,650,233; 6,243,003; 6,278,377; and/or 6,420,975, and/or PCT Application No. PCT/US03/30877, filed Oct. 1, 2003, and published on Apr. 15, 2004 as PCT Publication No. WO 2004/032568 A1, speakers, a compass or compass system, such as disclosed in U.S. Pat. Nos. 5,924,212; 4,862,594; 4,937,945; 5,131,154; 5,255,442; and/or 5,632,092, and/or U.S. patent application, Ser. No. 10/456,599, filed Jun. 6, 2003 by Weller et al. for INTERIOR REARVIEW MIRROR SYSTEM WITH COMPASS, now U.S. Pat. No. 7,004,593; and/or U.S. provisional application, Ser. No. 60/636,931, filed Dec. 17, 2004 by Blank et al. for INTERIOR REARVIEW MIRROR SYSTEM WITH COMPASS, a navigation system, such as described in U.S. Pat. No. 6,477,464, and U.S. patent applications, Ser. No. 10/456,599, filed Jun. 6, 2003 by Weller et al. for INTERIOR REAR VIEW MIRROR SYSTEM WITH COMPASS, now U.S. Pat. No. 7,004,593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corporation et al. For ACCESSORY SYSTEM FOR VEHICLE, and published on Jul. 15, 2004 as PCT Publication No. WO 2004/058540 A2, a tire pressure monitoring system, such as the types disclosed in U.S. Pat. Nos. 6,294,989; 6,445,287; and/or 6,472,979, and U.S. provisional application, Ser. No. 60/611,796, filed Sep. 21, 2004 by O'Brien for TIRE PRESSURE ALERT SYSTEM, a seat occupancy delector, a vehicle occupancy detector, such as the type described in U.S. provisional application, Ser. No. 60/630,364, filed Nov. 22, 2004 by Wåhlström for OCCUPANT DETECTION SYSTEM FOR VEHICLE, a trip computer, a telematics system, such as an ONSTAR® system or the like, and/or any other desired accessory or system or the like (with all of the above-referenced patents and patent applications and PCT applications and provisional applications being commonly assigned to Donnelly Corporation, and with the disclosures of all of the above referenced patents and patent applications and PCT applications and provisional applications being hereby incorporated herein by reference in their entireties).

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as Bluetooth™, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. patent application, Ser. No. 10/456,599, filed Jun. 6, 2003 by Weller et al. for INTERIOR REARVIEW MIRROR SYSTEM WITH COMPASS, now U.S. Pat. No. 7,004,593, which is hereby incorporated herein by reference, without affecting the scope of the present invention.

Figure 12:
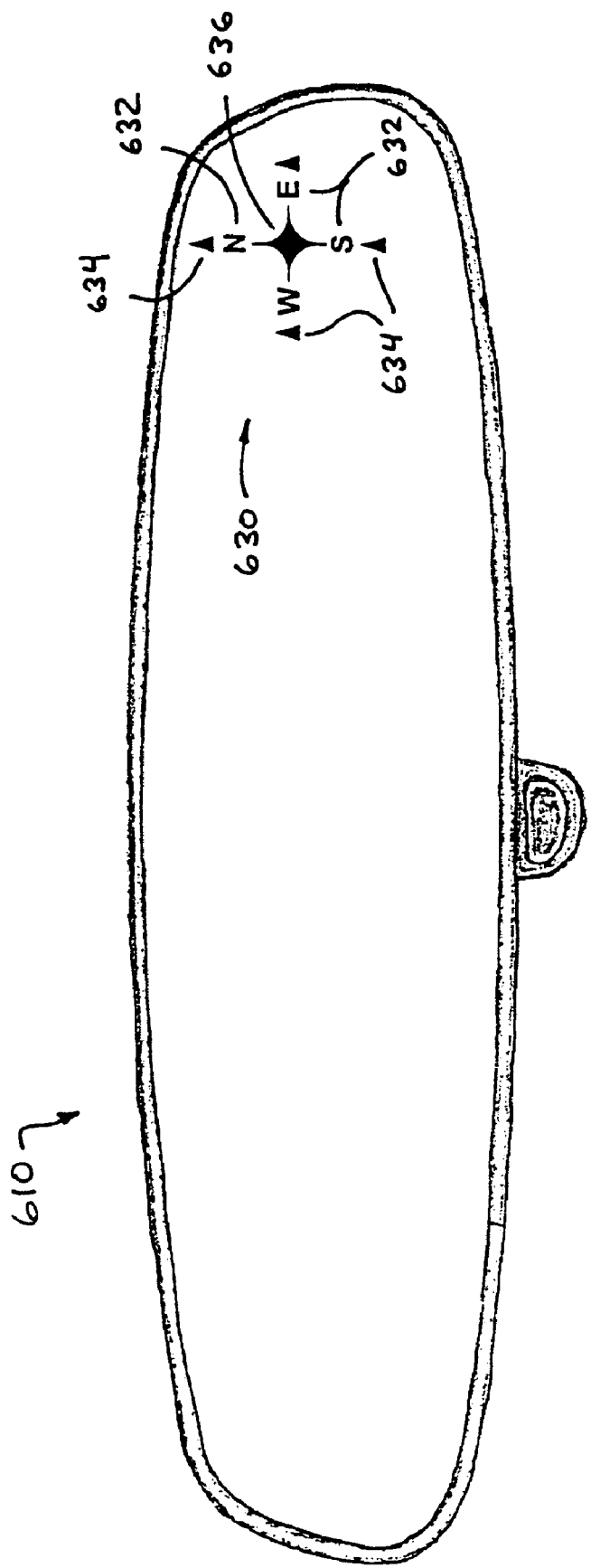
FIG. 12 is a front elevation of another rearview mirror assembly, showing a compass display in accordance with the present invention.
Figure 13:
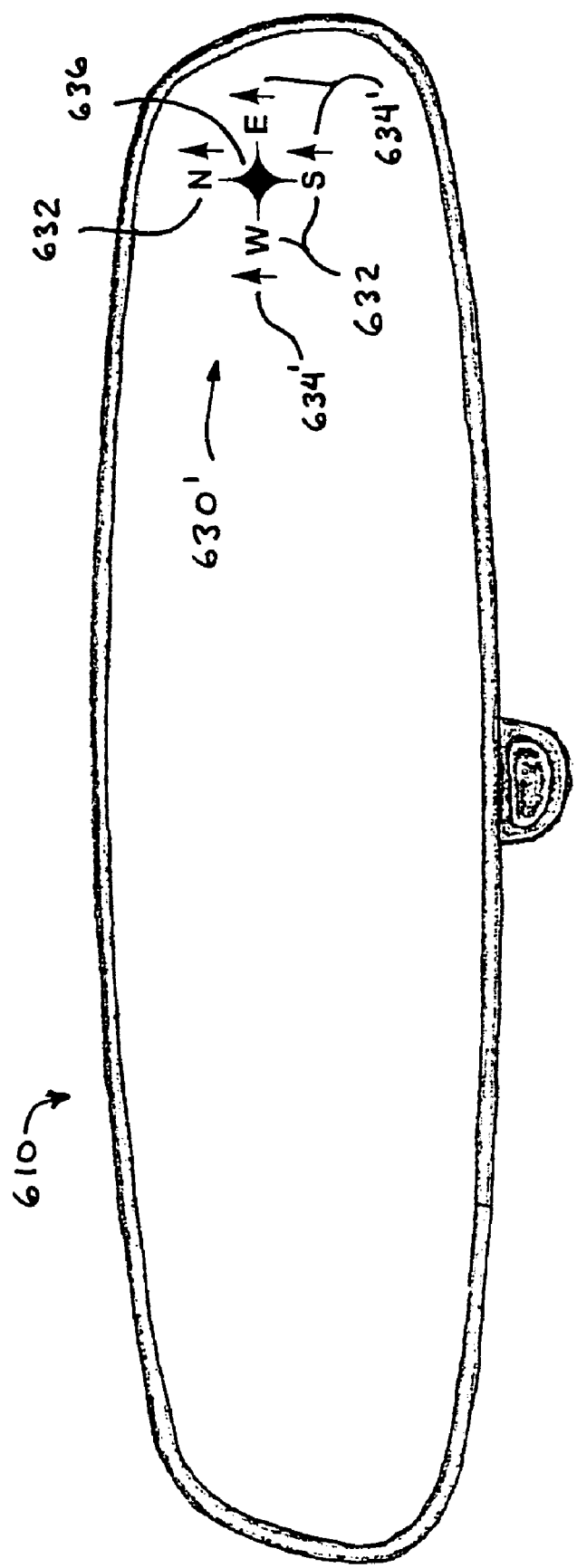
FIG. 13 is a front elevation of another rearview mirror assembly, showing another compass display in accordance with the present invention.
Figure 14:
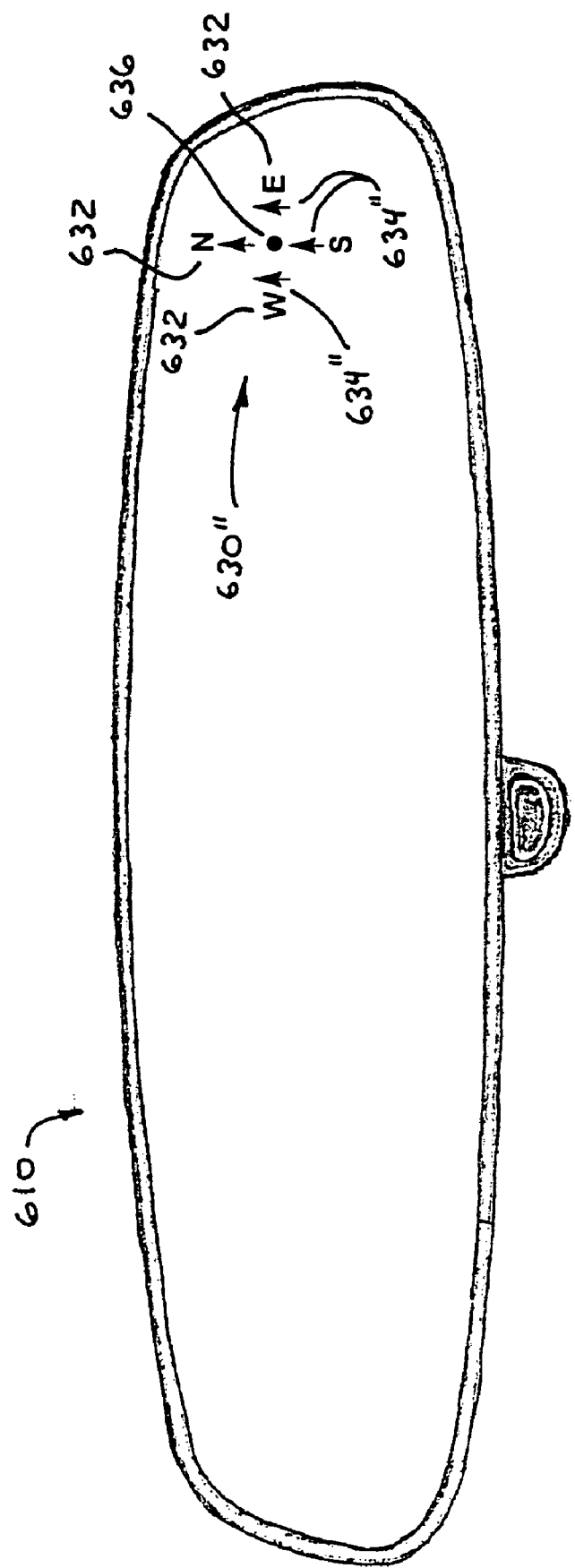
FIG. 14 is a front elevation of another rearview mirror assembly, showing another compass display in accordance with the present invention.

Optionally, and with reference to FIGS. 12–14, an interior rearview mirror assembly 610 may include an intuitive heading instructional icon element or display 630 at the reflective element 614, such as the types described in U.S. provisional application, Ser. No. 60/553,517, filed Mar. 16, 2004 by Schofield for MIRROR ASSEMBLY, which is hereby incorporated herein by reference. The compass display 630 may be associated with or controlled or adjusted by a compass system and/or a navigational system, such as a compass and/or navigational system of the types described in U.S. Pat. Nos. 6,678,614; 6,477,464; 5,924,212; 4,862, 594; 4,937,945; 5,131,154; 5,255,442; and/or 5,632,092, and/or U.S. patent applications, Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corporation et al. for ACCESSORY SYSTEM FOR VEHICLE, and published on Jul. 15, 2004 as PCT Publication No. WO 2004/058540 A2; and/or PCT Application No. PCT/

US2004/015424, filed May 18, 2004 by Donnelly Corp. et al. for MIRROR ASSEMBLY FOR VEHICLE, and published on Dec. 2, 2004 as PCT Publication No. WO 2004/103772 A2, and/or U.S. provisional application Ser. No. 60/636,931, filed Dec. 17, 2004 by Blank et al. for INTERIOR REARVIEW MIRROR SYSTEM WITH COMPASS, which are all hereby incorporated herein by reference.

Display 630 includes a plurality of characters or icons or letters 632 (such as N, E, S, W as shown in FIGS. 12–14) formed or etched in the reflective coating or layer of the reflective element 614 and includes an arrow or direction pointer 634 at each of the characters 632. The display 630 may also include a central port 636 through the reflective coating or layer reflective element 614 behind which may be positioned an illumination source as described above or a glare sensor, such as a photo sensor or the like, such as a glare sensor and/or an ambient light sensor and electrochromic automatic dimming circuitry described in U.S. Pat. Nos. 4,793,690 and 5,193,029, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, which are all hereby incorporated herein by reference. The arrows of direction pointers may point generally upward when the mirror assembly is mounted in the vehicle with the reflective element facing generally rearward and opposite to the direction of forward travel of the vehicle. The arrows or pointers thus may be representative of the direction of forward travel of the vehicle. As shown in FIGS. 12–14, the direction pointers of display 630 may comprise generally triangular shaped icons or pointers 634 positioned outward from the characters 632 and opposite the characters from the center or port 636 of the display (such as shown in FIG. 12), or the direction pointers of the display 630' may comprise arrows 634' positioned next to the characters 632 (such as shown in FIG. 13), or the direction pointers of the display 630" may comprise arrows 634" positioned inward of the characters 632 and between the respective characters and the center or port 636 (such as shown in FIG. 14).

The compass/navigation system may be operable to energize one or more illumination sources positioned at and rearward of a respective one of the characters 632 and corresponding direction pointer 634 to illuminate or back light the respective character and direction pointer. For example, the compass/navigation system may be operable to illuminate or back light a particular character and adjacent direction pointer to indicate to an occupant of the vehicle the direction that the vehicle is currently heading. For example, if the character "W" and the arrow or direction pointer next to the "W" are illuminated, then the display indicates that the vehicle is heading west. The intuitive heading instructional icon element or display thus may provide reinforcement to a viewer that when the character (such as "W" or other character) is illuminated, it is done so to indicate that the vehicle is traveling in the direction (such as west or other direction) indicated by the character. This is reinforced by the illumination of the corresponding arrow or direction pointer that points upward so as to be representative of pointing in the direction of forward travel of the vehicle. A person viewing the display thus will not misinterpret the illumination of the characters to be indicative of a driving or turning instruction (such as an instruction to turn the vehicle right or east to follow a programmed route) in connection with the navigation system.

Optionally, the display may function as a display for providing both an indication of the directional heading of the vehicle and an indication of which direction the vehicle should be turned in order to follow a programmed route or path. For example, only a particular direction pointer may be illuminated or back lit to indicate that the vehicle is heading in the direction indicated by the non-lit character next to the illuminated pointer, while a different character (separate from the illuminated pointer) may be illuminated or back lit to indicate that the vehicle is to be turned in that direction to follow a programmed route to a desired destination. The compass/navigation system and display thus may clearly display to a driver of the vehicle which direction the vehicle is heading at that time via the directional arrows, while the compass/navigation system and display may also be operable to provide driving or turning instructions to a driver of the vehicle to instruct the driver as to which direction the driver is to turn to follow a particular route to a desired destination. For example, the compass/navigation system may be associated with a global positioning system and/or telematics system of the vehicle, and may generate and display driving instructions to the driver of the vehicle as the vehicle is driven along a generated route, such as by utilizing aspects described in U.S. Pat. Nos. 6,678,614 and/or 6,477,464, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corporation et al. for ACCESSORY SYSTEM FOR VEHICLE, and published on Jul. 15, 2004 as PCT Publication No. WO 2004/103772 A2; and/or PCT Application No. PCT/US2004/015424, filed May 18, 2004 by Donnelly Corp. et al. for MIRROR ASSEMBLY FOR VEHICLE, and published on Dec. 2, 2004 as PCT Publication No. WO 2004/103772 A2, which are all hereby incorporated herein by reference.

During operation, the compass/navigation system thus may be operable to energize an illumination source positioned at and rearward of/behind a respective one of the characters to provide a driving instruction to the driver of the vehicle that is separate from the directional heading indication also provided by illumination or back lighting of the arrows or pointers of the display. For example, if the vehicle is heading generally west, the compass/navigation system may illuminate or back light the arrow next to the "W" to indicate to the driver of the vehicle that the vehicle is traveling generally in that direction. If the programmed route for the vehicle involves an upcoming right turn onto a generally northbound road, the compass/navigation system may then illuminate or back light the letter "N" to indicate to the driver of the vehicle that the driver should turn the vehicle to head north.

It is further envisioned that the illuminated character may be altered or adjusted as the vehicle gets closer to the turning point or intersection, such as by flashing the illumination source or intensifying the illumination source or changing the color of the illumination as the vehicle approaches the desired or appropriate turning point or intersection. It is also further envisioned that arrows pointing sideways may be provided at one or more of the characters of the display (or elsewhere at the display), and the appropriate arrow may be illuminated or back lit to indicate that the driver is to turn right or left to stay on the desired course or route. In such an embodiment, illumination or back lighting of the character may be indicative of the directional heading of the vehicle, while illumination or back lighting of the arrows may be indicative of the driving instructions to the driver of the vehicle.

The intuitive display elements thus provide a clear indication as to which direction the vehicle is presently traveling by providing a directional heading arrow or pointer at each of the compass heading characters. The driver of the vehicle thus will not likely become confused as to the meaning of the illuminated characters or letters. The compass/navigation system and display of the present invention also may provide point-to-point driving instructions and the present directional heading of the vehicle with the same display or display icons/characters.

Optionally, a variety of display types or screens can be utilized in conjunction with an interior rearview mirror assembly or windshield electronics module/accessory module of the present invention. For example, any of the liquid crystal type display or video screens (such as the types disclosed in PCT Application No. PCT/US03/40611, filed Dec. 19, 2003 by Donnelly Corp. et al. for ACCESSORY SYSTEM FOR VEHICLE, and published on Jul. 15, 2004 as PCT Publication No. WO 2004/058540 A2, and/or U.S. provisional application Ser. No. 60/630,061, filed Nov. 22, 2004 by Lynam et al. for MIRROR ASSEMBLY WITH VIDEO DISPLAY, which are hereby incorporated herein by reference) can be utilized. Also, a microdisplay (such as is available from MicroVision Inc. of Bothell, Wash.), in which a single scanner is used to direct multiple light beams simultaneously into separate zones of an image so as to deliver a bright, high resolution, image over a wide field of view, can be used. Such a microdisplay may utilize conventional surface emitting or other types of light emitting diodes (LEDs) as light sources to provide an economical display with sharp resolution and high image brightness. For example, multiple red, green and blue LEDs can be used to write several million red, green, and blue spots that integrate to form a single high-fidelity image in a mega pixel display image. Such scanning display technologies can utilize a biaxial microelectromechanical scanner (MEMS) and other display/mechanical and electronics devices, such as are disclosed in U.S. Pat. Nos. 6,714,331; 6,795,221; and 6,762,867, which are hereby incorporated herein by reference, and can provide increased spatial resolution. Such displays can deliver an image with a full 30-degree horizontal field of view or more. Such a microdisplay/MEMS device can, for example, be placed in the mirror housing behind the mirror reflective element in an interior (or exterior) mirror assembly such that the image is projected onto the rear of the mirror reflective element, such as is disclosed in U.S. patent application Ser. No. 10/225,851, filed Aug. 22, 2002 by Burgner for VEHICLE INFORMATION DISPLAY, now U.S. Pat. No. 6,847,487, which is hereby incorporated herein by reference.

If the mirror reflector of the mirror element is of the transflective (substantially reflective and at least partially transmitting to light) type, the driver or other occupant in the interior cabin of the vehicle can view the image (being back-projected onto the rear of the mirror reflective element) by viewing the mirror reflective element. Because such back-projected microdisplays can have a very high image brightness (due to use of very high brightness LEDs as illuminators), image wash-out during driving under high ambient lighting conditions (such as on a sunny day) is reduced using such scanning image microdisplay technology compared to use, for example, of TFT LCD displays.

Also such MEMS technology can be used in a heads-up-display (HUD) system, such as the MicroHUD™ head-up display system available from MicroVision Inc. of Bothell, Wash. This provides a compact heads-up display capable of meeting specific size and performance specifications. For example, MicroVision's MicroHUD™ combines a MEMS-based micro display with an optical package of lenses and mirrors to achieve a compact high-performance HUD module that reflects a virtual image off the windscreen that appears to the driver to be close to the front of the car. This laser-scanning display can outperform many miniature flat panel LCD display screens because it can be clearly viewed in the brightest conditions and also dimmed to the very low brightness levels required for safe night-time driving.

The high-resolution MicroHUD™ display may be completely reconfigurable, enabling virtually any content to be displayed, including video or animated icons and graphics. Advantageously, such a MicroHUD™ display unit may be included at or within an interior rearview mirror assembly or a windshield electronics module/accessory module so as to project its image therefrom onto the inner surface of the windshield. This unique packaging of a HUD or projection image displayer into an interior rearview mirror assembly or a windshield electronics module/accessory module has advantages over conventional placement of such HUD projectors into the dashboard of the vehicle. These advantages include that the HUD image projector need not find space in an already crowded dashboard (where, for example, a center information cluster may want space or where HVAC ducts/components may run). Also, incorporation of the HUD projector in the likes of the mounting portion of the interior mirror assembly or into a windshield electronics module/accessory module can allow a HUD display to be provided more readily as an optional accessory for the vehicle or as a dealership option or aftermarket device. A variety of images (such as, for example, iconistic or graphical or video or textural or alphanumerical or numerical or the like) can be displayed, such as information from a side object/blind spot monitoring system, such as the types described in U.S. Pat. No. 5,929,786, and/or U.S. patent applications, Ser. No. 10/427,051, filed Apr. 30, 2003 by Pawlicki et al. for OBJECT DETECTION SYSTEM FOR VEHICLE, now U.S. Pat. No. 7,038,577; and/or Ser. No. 10/209,173, filed Jul. 31, 2002 by Schofield for AUTOMOTIVE LANE CHANGE AID, now U.S. Pat. No. 6,882,287, and/or U.S. provisional application Ser. No. 60/638,687, filed Dec. 23, 2004 by Higgins-Luthman for OBJECT DETECTION SYSTEM FOR VEHICLE, which are hereby incorporated herein by reference.

Also, a full video image captured by the likes of a reversing camera or a forward facing night vision camera or a sidelane-monitoring camera can be displayed on/via the vehicle windshield (or elsewhere) by the likes of a MicroHUD™ device and, conceptually, thus replacing the exterior mirrors with cameras. For example, a driver sidelane video image and a passenger sidelane video image, both preferably with graphic overlays thereon, can be displayed at respective sides of the vehicle windshield via a MEMS-based display system (such as via a MicroHUD™ HUD display device) and with the image visible to the driver by viewing the vehicle windshield (such as via an optical image combiner created on the inner glass surface of the windshield and/or onto the polymeric laminating interlayer (typically a sheet of polyvinyl butyral or of silicone or the like) utilized in the laminate windshield).

Optionally, the interior rearview mirror assembly of the vehicle may include or may be associated with an accessory that includes or is associated with a sensor adapted for detection of the presence of moisture on the inner surface of the windshield of the vehicle. The accessory may activate a heating, ventilation and air conditioning (HVAC) system (such as by turning on a vehicular air conditioning or a heating system and/or turning on an air blower that directs air to the inner surface of the windshield for demisting/decondensation purposes) in response to a threshold level of moisture being detected. Such an interior mirror demisting sensor accessory (accommodated, for example, in a mirror mount or mirror support arm proximate where the mirror assembly mounts to an attachment member, such as a mirror-mounting button that is adhered to the inner surface of the windshield, or accommodated in a pod that attaches to a mirror mount/mirror support arm) is preferably a capacitive moisture sensor for detecting surface condensation, such as is disclosed in U.S. Pat. No. 6,614,241, issued to Schmitt et al., the entire disclosure of which is hereby incorporated by reference herein. Such a compact capacitive moisture sensor may comprise a carrier, a metal layer applied to the carrier to form an interdigital structure, a passivation layer formed over the metal layer, and a hydrophilic layer applied over the passivation layer, where the hydrophilic layer increases a surface tension of the passivation layer. Such a sensor is available from Preh-Werke GmbH & Co. KG of Saale, Germany. Optionally, such a capacitive sensor may be mounted proximate to the windshield of the vehicle, such as in a windshield electronics/accessory module, such as disclosed in U.S. Pat. Nos. 6,824,281; 6,290,268; 6,250,148; 6,341,523; 6,593,565; and 6,326,613, which are all hereby incorporated herein by reference, without affecting the scope of the present invention.

Optionally, the mirror assembly may also or alternately include a cabin air monitor for monitoring the air within the vehicle cabin. For example, and as disclosed in U.S. Pat. No. 6,428,172, which is hereby incorporated herein by reference, a vehicle cabin air monitor can be incorporated into an interior mirror assembly, such as within a mirror housing that includes the reflective element, or in a pod or housing that attaches to the mirror mount. Alternately, such a vehicle cabin air monitor can be included in windshield electronics module/accessory module, without affecting the scope of the present invention. For example, levels of carbon monoxide may be monitored by such air monitors provided at the mirror location or accessory module location. Preferably, the air monitor includes an intake, preferably a fan assisted intake that samples the air within the cabin. In a preferred form, when the vehicle cabin level of carbon monoxide exceeds a threshold level, the monitor takes appropriate action, such as, for example, sounding an alarm, shutting off the engine, and/or opening windows of the vehicle or the like. Such an air monitoring system is preferably used with a remote ignition system, such as is commonly used in cold climates when the engine is started up remotely. Such a vehicle air monitoring system protects against the build up of carbon monoxide within the vehicle cabin and protects against the threat of carbon monoxide poisoning to a human being or other animal within the vehicle cabin.

Optionally, for example, an interior mirror assembly or a pod attached thereto or a windshield electronics module/accessory module can include an in-cabin humidity detector (such as the type described above) that draws in cabin air via a small fan, detects the humidity level, and then determines whether or not to turn on the HVAC blower to demist the windshield. Such an accessory or system may include a carbon monoxide monitor (such as described above) to determine the level of carbon monoxide in the vehicle cabin.

The user actuatable inputs of the present invention may be operable to control any of the accessories of or associated with the mirror assembly and/or accessory module or the like. Optionally, the mirror assembly and/or accessory module and/or console or the like may include other user inputs or actuating devices, without affecting the scope of the present invention. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; and 6,627,918, and U.S. patent application Ser. No. 09/817,874, filed Mar. 26, 2001 by Quist et al. for INTERACTIVE AUTOMOTIVE REARVISION SYSTEM, which are hereby incorporated herein by reference, or such as proximity sensors of the types described in U.S. Pat. Publication No. 2002/0044065, published Apr. 18, 2002 by Quist et al. for INTERACTIVE AUTOMOTIVE REARVISION SYSTEM; and/or U.S. patent applications Ser. No. 10/933,842, filed Sep. 3, 2004; and/or Ser. No. 10/956,749, filed Oct. 1, 2004; and/or PCT Application No. PCT/US03/40611, filed Dec. 19, 2003 by Donnelly Corp. et al. for ACCESSORY SYSTEM FOR VEHICLE, and published on Jul. 15, 2004 as PCT Publication No. WO 2004/058540 A2, which are hereby incorporated herein by reference, or such as membrane type switches, such as described in U.S. provisional applications, Ser. No. 60/575,904, filed Jun. 1, 2004 by Uken for MIRROR ASSEMBLY FOR VEHICLE; and/or Ser. No. 60/624,320, filed Nov. 2, 2004 by Uken for MIRROR ASSEMBLY FOR VEHICLE, which are hereby incorporated herein by reference, or such as detectors and the like, such as the types disclosed in U.S. Pat. Nos. 6,504,531; 6,501,465; 6,492,980; 6,452,479; 6,437,258; and 6,369,804, and/or U.S. patent application Ser. No. 11/021,065, filed Dec. 23, 2004 by McCabe et al. for ELECTRO-OPTIC MIRROR CELL, which are hereby incorporated herein by reference, and/or the like, without affecting the scope of the present invention.

Therefore, the present invention provides a human machine interface with at least one user actuatable input at the bezel portion and/or casing of the mirror assembly. The user actuatable inputs may be integrally formed or molded with the bezel portion or may be insert molded in the bezel during the molding of the bezel portion of the mirror assembly, and may be actuatable to control or adjust or toggle or modulate or activate/deactivate an accessory or system or display or the like that is at or in or associated with the mirror assembly. The actuator is integrally formed with the bezel so that a separate keypad or other buttons need not be assembled or positioned at the bezel during the assembly of the mirror assembly. The bezel (with the integrally formed or molded or insert molded toggle or button or actuator or the like) may be attached to a reflective element and/or printed circuit board and/or mirror casing, such that the actuator is positioned at or aligned with a corresponding PCB-mounted element or switch at the printed circuit board within the mirror assembly. The present invention thus provides enhanced manufacturing and assembly of an interior rearview mirror assembly. Optionally, the user input may be positioned partially within the casing and may pivot and/or flex to contact and actuate the element or switch or switches at the printed circuit board. The user input thus may comprise a low cost plastic or polymeric lever or member that may be readily positioned within the casing during assembly of the rearview mirror assembly.

Changes and modifications in the specifically described embodiments may be carried out without departing from the principles of the present invention, which is intended to be limited only by the scope of the appended claims, as interpreted according to the principles of patent law.

What is claimed is:

1. An interior rearview mirror assembly for a vehicle, said interior rearview mirror assembly comprising:
a casing comprising a bezel;
said bezel formed of a molded plastic material in a molding operation;
at least one portion of said bezel adapted in said molding operation to provide a user actuatable element;
user actuatable element integrally formed at said portion of said bezel during said molding operation that forms said bezel, said user actuatable element comprising a molded plastic material body portion and a molded plastic material flexible portion, said molded plastic material flexible portion connecting said molded plastic material body portion to the remainder of said bezel so that said body portion is movable relative to the remainder of said bezel via flexing of said flexible portion when said user actuatable element is actuated by a user pressing said body portion;
circuitry, said circuitry disposed within said casing and having an electrical actuation switch located generally proximate to and rearward of said body portion or said user actuatable element; and
said electrical actuation switch of said circuitry being actuatable by a user of the vehicle pressing said body portion whereby movement of said body portion via flexing of said flexible portion causes said body portion to contact said electrical actuation switch to actuate said electrical actuation switch.

2. The interior rearview mirror assembly of claim 1, wherein said circuitry is disposed on a printed circuit board.

3. The interior rearview mirror assembly of claim 1, wherein said at least one user actuatable element includes at least one actuating portion that is insert molded with said portion of said bezel.

4. The interior rearview mirror assembly of claim 1, wherein said user actuatable element is at least partially at a chin portion of said bezel.

5. The interior rearview mirror assembly of claim 1, wherein said body portion of said at least one user actuatable element comprises a surface finish that is different than a surface finish of the remainder of said bezel.

6. The interior rearview mirror assembly of claim 1, wherein said casing comprises a rear cap portion that supports at least one electrical element thereat.

7. The interior rearview mirror assembly of claim 1, wherein said casing comprises a resinous material and said at least one user actuatable input comprises said resinous material.

8. The interior rearview minor assembly of claim 7, wherein said at least one user actuatable element includes a hinge established of said resinous material.

9. The interior rearview mirror assembly of claim 7, wherein said resinous material comprises an olefin material.

10. The interior rearview mirror assembly of claim 7, wherein said resinous material comprises a polypropylene material.

11. The interior rearview mirror assembly of claim 7, wherein said at least one user actuatable element comprises a user actuated portion that is movable via flexing of at least a portion of said at least one user actuatable element to operate said at least one element of said circuitry.

12. The interior rearview mirror assembly of claim 11, wherein said user actuated portion includes an insert portion.

13. The interior rearview mirror assembly of claim 12, wherein said insert portion comprises at least one of a translucent insert portion and a printed insert portion.

14. The interior rearview mirror assembly of claim 1, wherein said at least one user actuatable element comprises at least one of a user actuatable button, a touch sensor and a proximity sensor.

15. The interior rearview minor assembly of claim 1, wherein said minor assembly includes at least one accessory associated therewith.

16. The interior rearview minor assembly of claim 15, wherein said accessory is associated with a moisture sensor for detecting moisture on an interior surface of the vehicle windshield.

17. The interior rearview mirror assembly of claim 16, wherein said accessory activates a blower motor of a heating, ventilation and air conditioning system of the vehicle in response to a threshold level of moisture being detected.

18. The interior rearview mirror assembly of claim 16, wherein said moisture sensor comprises a capacitive moisture sensor for detecting surface condensation.

19. The interior rearview mirror assembly of claim 15, wherein said accessory comprises a cabin air monitoring device that monitors the air within the cabin of the vehicle.

20. The interior rearview mirror assembly of claim 19, wherein said cabin air monitoring device monitors the level of carbon monoxide present in the air within the cabin of the vehicle.

21. The interior rearview mirror assembly of claim 20, wherein said accessory is operable in response to a detection of a carbon monoxide level within the cabin of the vehicle exceeding a threshold level.

22. The interior rearview mirror assembly of claim 21, wherein said accessory is operable to at least one of activate an alert, deactivate the engine, and open at least one window of the vehicle in response to the detection of carbon monoxide exceeding said threshold level.

23. The interior rearview mirror assembly of claim 20, wherein said accessory comprises an air intake.

24. The interior rearview mirror assembly of claim 23, wherein said air intake comprises a fan assisted intake.

25. The interior rearview mirror assembly of claim 20, wherein said accessory is associated with a remote ignition system of the vehicle.

26. The interior rearview mirror assembly of claim 20, wherein said air monitoring device is associated with a humidity sensing device that detects a humidity level within the cabin of the vehicle.

27. The interior rearview mirror assembly of claim 26, wherein said accessory controls a blower motor of a heating, ventilation and air conditioning system of the vehicle in response to a detection of the humidity level exceeding a threshold level.

28. An interior rearview mirror assembly for a vehicle, said interior rearview mirror assembly comprising:
a casing, said easing formed of a molded plastic material in a molding operation;
at least one portion of said casing adapted in said molding operation to provide a user actuatable element, said user actuatable element integrally formed at said portion of said easing during said molding operation that forms said casing;
said user actuatable clement comprising a molded plastic material body portion and a molded plastic material flexible portion, said molded plastic material flexible portion connecting said molded plastic material body portion to the remainder of said casing so that said body portion is movable relative to the remainder of said casing via flexing of said flexible portion when said user actuatable element is actuated by a user pressing said body portion;

circuitry disposed within said casing and having an electrical actuation switch located generally proximate to and rearward of said body portion of said user actuatable element; and said electrical actuation switch of said circuitry being actuatable by a user of the vehicle pressing said body portion whereby movement of said body portion via flexing of said flexible portion causes said body portion to contact said electrical actuation switch to actuate said electrical actuation switch.

29. The interior rearview mirror assembly of claim 28, wherein said user actuatable element is at least partially at a rear casing portion of said casing.

30. The interior rearview mirror assembly of claim 29, wherein said circuitry is disposed on a printed circuit board.

31. The interior rearview mirror assembly of claim 29, wherein said circuitry comprises compass circuitry.

32. The interior rearview mirror assembly of claim 29, wherein said rear casing portion comprises a rear cap portion that attaches to a bezel portion of said casing.

33. The interior rearview mirror assembly of claim 28, wherein said casing comprises a resinous material and said at least one user actuatable input comprises said resinous material.

34. The interior rearview mirror assembly of claim 33, wherein said user actuatable element includes a hinge established of said resinous material.

35. The interior rearview mirror assembly of claim 34, wherein said resinous material comprises an olefin material.

36. The interior rearview mirror assembly of claim 34, wherein said resinous material comprises a polypropylene material.

37. The interior rearview mirror assembly of claim 28, wherein said body portion of said at least one user actuatable element comprises a surface finish that is different than a surface finish of said casing.

38. The interior rearview mirror assembly of claim 28, wherein said circuitry comprises compass circuitry and wherein said electrical actuation switch operates a calibration control and a zone control of said compass circuitry.

39. An interior rearview mirror assembly for a vehicle, said interior rearview mirror assembly comprising:

a casing, said casing comprising a molded plastic material;

said casing having a user actuatable element thereat, said user actuatable element being integrally formed at a portion of said casing during the molding operation that forms said casing;

circuitry disposed within said casing, said at least one user actuatable input being actuatable by a user to operate an element of said circuitry;

wherein said user actuatable element comprises a molded plastic user actuated portion that is movable via flexing of a molded plastic flexible portion of said user actuatable element relative to the remainder of said casing so that said user actuated portion is movable when said user actuatable element is actuated by a user pressing said user actuated portion;

said element of said circuitry being located generally proximate to and rearward of said user actuated portion of said user actuatable element; and said element of said circuitry being actuatable by a user of the vehicle pressing said user actuated portion of said user actuatable element.

40. The interior rearview mirror assembly of claim 39, wherein said circuitry is disposed on a printed circuit board.

41. The intoner rearview mirror assembly of claim 39, wherein said user actuatable element includes at least one actuating portion that is insert molded with said portion of said casing.

42. The interior rearview mirror assembly of claim 39, wherein said user actuatable element is at least partially at a bezel portion of said easing.

43. The interior rearview mirror assembly of claim 39, wherein said user actuatable element is at least partially at a rear casing portion of said casing.

44. The interior rearview minor assembly of claim 43, wherein said rear casing portion comprises a rear cap portion that supports at least one electrical element thereat.

45. The interior rearview mirror assembly of claim 39, wherein said casing comprises a resinous material and said user actuatable element comprises said resinous material.

46. The interior rearview mirror assembly of claim 45, wherein said user actuatable element includes a hinge established of said resinous material.

47. The interior rearview mirror assembly of claim 45, wherein said resinous material comprises an olefin material.

48. The interior rearview mirror assembly of claim 45, wherein said resinous material comprises a polypropylene material.

49. The interior rearview mirror assembly of claim 39, wherein said user actuated portion includes an insert portion.

50. The interior rearview mirror assembly of claim 49, wherein said insert portion comprises at least one of a translucent insert portion and a printed insert portion.

51. The interior rearview minor assembly of claim 39, wherein said user actuatable element comprises at least one of a user actuatable button, a touch sensor and a proximity sensor.

52. The interior rearview minor assembly of claim 39, wherein said mirror assembly includes at least one accessory associated therewith.

* * * * *

UNITED STATES PATENT AND TRADEMARK OFFICE
CERTIFICATE OF CORRECTION

PATENT NO. : 7,253,723 B2
APPLICATION NO. : 11/029695
DATED : August 7, 2007
INVENTOR(S) : Lindahl et al.

It is certified that error appears in the above-identified patent and that said Letters Patent is hereby corrected as shown below:

Column 6
Line 34, "U.S" should be --U.S.--

Column 10
Line 18, insert --board was successfully activated. Illumination source 124 may comprise a vacuum-- after "circuit"

Column 12
Line 38, insert --hereby-- after "is"

Column 19
Line 21, "Publcation" should be --Publication--

Column 20
Line 3, "delector" should be --detector--

Column 22
Line 33, "2004/103772 A2;" should be --2004/058540 A2--

Column 27
Line 11, insert --said-- before "user"
Line 24, "or" should be --of--
Line 48, "thercat" should be --thereat--
Line 53, "minor" should be --mirror--

Column 28
Lines 8 and 9, "minor" should be --mirror--
Line 11, "minor" should be --mirror--
Lines 56 and 61, "easing" should be --casing--
Line 63, "clement" should be --element--

UNITED STATES PATENT AND TRADEMARK OFFICE
CERTIFICATE OF CORRECTION

PATENT NO. : 7,253,723 B2
APPLICATION NO. : 11/029695
DATED : August 7, 2007
INVENTOR(S) : Lindahl et al.

It is certified that error appears in the above-identified patent and that said Letters Patent is hereby corrected as shown below:

Column 30
Line 16, "intoner" should be --interior--
Line 22, "easing" should be --casing--
Line 27, "minor" should be --mirror--
Line 29, "thercat" should be --thereat--
Line 47, "minor" should be --mirror--
Line 51, "minor" should be --mirror--

Signed and Sealed this

Sixth Day of January, 2009

JON W. DUDAS
*Director of the United States Patent and Trademark Office*